United States Patent [19]
Smith et al.

[11] Patent Number: 6,163,097
[45] Date of Patent: Dec. 19, 2000

[54] MOTOR GENERATOR INCLUDING INTERCONNECTED STATORS AND STATOR LAMINATIONS

[75] Inventors: Stephen H. Smith, Leucadia; Yuval Shenkal, Cardiff, both of Calif.

[73] Assignee: Smith Technologies Development, LLC, San Diego, Calif.

[21] Appl. No.: 09/241,837

[22] Filed: Feb. 1, 1999

Related U.S. Application Data

[63] Continuation of application No. 08/763,824, Dec. 11, 1996, Pat. No. 5,982,074.

[51] Int. Cl.[7] .................................................. H02K 1/22
[52] U.S. Cl. .................... 310/261; 310/67 R; 310/68 R; 310/254; 310/258; 310/259; 310/268
[58] Field of Search ................................ 310/67 R, 68 R, 310/254, 258, 259, 268

[56] References Cited

U.S. PATENT DOCUMENTS

| | | | |
|---|---|---|---|
| 3,992,641 | 11/1976 | Heinrich et al. | 310/168 |
| 4,100,444 | 7/1978 | Boyd, Jr. | 310/184 |
| 4,187,441 | 2/1980 | Oney | 310/112 |
| 4,234,808 | 11/1980 | Geppert et al. | 310/49 R |
| 4,350,914 | 9/1982 | Searle | 310/194 |
| 4,358,693 | 11/1982 | Palmer et al. | 310/46 |
| 4,371,801 | 2/1983 | Richter | 310/156 |
| 4,484,097 | 11/1984 | Kanayama et al. | 310/268 |
| 4,710,667 | 12/1987 | Whiteley | 310/268 |
| 4,761,576 | 8/1988 | Savage | 310/51 |
| 5,117,141 | 5/1992 | Hawsey et al. | 310/114 |
| 5,280,210 | 5/1992 | Kress et al. | 310/158 |
| 5,287,030 | 2/1994 | Nutter | 310/89 |
| 5,806,169 | 9/1998 | Trago et al. | 29/596 |
| 5,866,961 | 2/1999 | Suzuki et al. | 310/67 R |

*Primary Examiner*—Elvin Enad
*Attorney, Agent, or Firm*—Kenyon & Kenyon

[57] ABSTRACT

An axial field motor/generator having a rotor that includes at least three annular discs magnetized to provide multiple sector-shaped poles. Each sector has a polarity opposite that of an adjacent sector, and each sector is polarized through the thickness of the disc. The poles of each magnet are aligned with opposite poles of each adjacent magnet. Metal members adjacent the outermost two magnets contain the flux. The motor/generator also has a stator that includes a stator assembly between each two adjacent magnets. Each stator assembly includes one or more conductors or windings. Although the conductors may be formed of wire having a round, uniform cross-section, they may alternatively be formed of conductors having a tapered cross-section that corresponds to the taper of the sectors in order to maximize the density of the conductor in the gap between axially adjacent poles. The conductors may also alternatively be formed of traces in a printed circuit, which may have one or more layers. Each stator assembly may be removably connectable to another stator assembly to provide modularity in manufacturing and to facilitate selection of the voltage at which the motor/generator is to operate. Electrical contacts, such as pins extending from the casing, may removably connect the conductors of adjacent stator assemblies. A magnet may be dynamically balanced on the shaft by hardening a thin ring of cross-linked resin between the magnet and the shaft while the shaft is spun, using ultraviolet light to polymerize the resin.

15 Claims, 13 Drawing Sheets

MOTOR GENERATOR INCLUDING INTERCONNECTED STATORS AND STATOR LAMINATIONS

This is a continuation of application Ser. No. 08/763,824, filed on Dec. 11, 1996 now U.S. Pat. No. 5,982,074.

BACKGROUND OF THE INVENTION

1. Field of the Invention

The present invention relates generally to electric motor/generators and, more specifically, to a permanent magnet, axial field motor/generator.

2. Description of the Related Art

An electric motor, which is a machine for converting current into motion, typically includes a rotor that rotates within a stator in response to a magnetic field. In a permanent magnet motor, the rotor or stator, typically the stator, includes one or more permanent magnets that generate a magnetic field. Permanent magnets may be made of ferrous metals or ferroceramic materials. Because the machine may also be used to convert motion into electric current, the machine is often referred to in the art as a motor/generator or a dynamo. Therefore, although the term "motor" is used herein for convenience, it should be understood that the same machine may be used as a generator.

The rotor or stator of a permanent magnet motor, typically the rotor, includes conductors, such as copper wire, wound around a form. These windings typically have numerous turns of the wire in order to maximize the magnitude of the magnetic field.

In certain permanent magnet motors, the stator includes a metal casing that holds two or more magnets and completes the magnetic circuit between them. The casing typically comprises metal plates or laminations to minimize eddy currents. Increasing the amount of metal in the casing lowers the reluctance of the circuit, thereby increasing the proportion of magnetic flux in the gaps between the magnet poles through which the rotor windings move.

Common motor magnet materials include iron, an aluminum-nickel-cobalt alloy known as Alnico, and rare-earth materials, such as a samarium-cobalt alloy. These materials provide a strong magnetic field but are quite heavy.

Motor magnets commonly must be magnetized in-place, i.e., after they have been assembled into the metal motor casing, to minimize demagnetization upon assembly. If a magnet is removed from the casing (or inserted into it), the act of removing (or inserting) it generally demagnetizes it to some extent. Replacing the magnet would result in diminished performance. To minimize demagnetization, a metal "keeper" may temporarily be attached to a magnet prior to mounting it in a motor or other device.

Practitioners in the art have developed axial field motors having magnets disposed on a rotor with their fields aligned parallel to the axis of rotation of the motor. Axial field motors do not require heavy metal casings to contain the field. Practitioners in the art have developed small axial field motors that include economical ferroceramic magnets. Unlike rare earth magnets, ferroceramic magnets can readily be magnetized into multiple poles because they have a relative permeability ("$\mu$") on the order of 1. (Permeability is defined as the ratio between the magnetic field density (B) of a material to its magnetic field intensity (H). Air, by definition, has a relative permeability of 1.) In certain such motors, each rotor disc is magnetized into multiple sector-shaped poles. Each sector has a polarity opposite that of an adjacent sector, and each sector is polarized through the thickness of the disc. The rotor is disposed adjacent to the stator on a common axis. The stator of such a motor typically consists of multiple toroidal windings. The magnetic field through which the windings pass is concentrated between two adjacent sectors of the same disc.

Motors having ferroceramic magnets produce lower torque than motors having magnets made of high-permeability materials, such as iron, Alnico and rare earth materials, because ferroceramic magnets exhibit a lower flux density. To obtain an increase in torque, the rotor may have two disc magnets, one on each side of the stator. Half of each toroidal winding of the stator thus passes through the magnetic field generated by one magnet of the rotor, and the other half of the winding passes through the magnetic field generated by the other rotor magnet. Nevertheless, the density of the flux through which each winding half moves is limited to that produced by the disc magnet to which it is closest. The use of multiple pole ferroceramic magnets is therefore largely confined to small, low-torque motors, such as stepper-type motors used in disk drives.

It would be desirable to provide an economical motor that has a high power-to-weight or efficiency ratio. These needs are clearly expressed in the art and are satisfied by the present invention in the manner described below.

SUMMARY OF THE INVENTION

The present invention pertains to an axial field motor/generator having a rotor that includes at least three annular discs magnetized to provide multiple sector-shaped poles. Each sector has a polarity opposite that of an adjacent sector, and each sector is polarized through the thickness of the disc. These magnets may be made of any suitable, relatively low magnetic permeability ("$\mu$") material, such as a ferroceramic material having a permeability of no more than about 100 times the permeability of air. The poles of each magnet are aligned with opposite poles of each adjacent magnet. The magnetic flux thus is oriented axially through aligned sectors of adjacent magnets. Metal members adjacent to the outermost two magnets contain the flux in the rotor. Thus, conceptually, the flux follows a circular serpentine path through and around the rotor.

The magnets are polarized into a plurality of sectors, which minimizes demagnetization prior to assembly of the rotor. Thus, the magnets need not be magnetized in-place, i.e., after assembly, as in certain conventional motors. Moreover, it is not necessary to use a keeper tool to maintain magnetization during assembly.

The motor/generator also has a stator that includes a layer of conductors or windings between each two adjacent rotor magnets. Each layer may have multiple conductor phase assemblies, each providing one of a plurality of phases. Although the conductors may be formed of conventional wire having a round, uniform cross-section, they may alternatively be formed of conductors having a tapered cross-section that corresponds to the taper of the sectors. This type of cross-section maximizes the density of the conductor in the gap between axially adjacent poles and, thus, the current capacity of the conductor. The cross-sectional shape may be rectangular to further maximize conductor density.

The terms "rotor" and "stator," as defined herein, are used for purposes of convenience to mean only that the rotor and stator rotate with respect to one another. The terms are not intended to limit the invention to a structure in which the rotor rotates and the stator is stationary with respect to the earth or other frame of reference. For example, the rotor may be fixedly connected to a vehicle body, and the stator may be fixedly connected at its periphery to a tire, whereby the rotation of the stator and its tire relative to the rotor and the vehicle body propels the vehicle.

Although the magnets do not have as high a magnetic flux density ("B") as rare earth magnets and other high-permeability magnets, they have a higher maximum energy product. Energy product is the product of flux density and magnetization force or coercivity ("H") at the point along the magnet's characteristic B–H plot at which the motor/generator is operating. The magnets are thus preferably spaced apart from one another by a distance corresponding to the maximum energy product.

The inclusion of three or more rotor magnets in the manner described above more than offsets the negative effect of lower flux density on motor efficiency. Each point or magnetic domain within each center magnet, i.e., a magnet other than the two outer magnets, contributes equally to the magnetic flux through which the stator conductors pass. Flux emanating from domains immediately to either side of the midplane of a center magnet thus has a shorter gap to traverse than flux emanating from corresponding domains in a conventional axial field motor. In other words, both "sides" of each center magnet contribute to the total flux interacting with a stator conductor. Using both sides of the magnet in this manner produces a high average energy product.

Each layer of the stator may be removably connectable to another layer to provide modularity in manufacturing and to facilitate selection of the voltage at which the motor/generator is to operate. Each layer may include a casing in which the conductors are enclosed or embedded. Electrical contacts, such as pins extending from the casing, removably connect the conductors of adjacent layers. Because voltage is dependent upon the length of a conductor that passes through a magnetic field, selecting the total conductor length of each phase selects the voltage. The pins or other electrical contacts may be disposed around the casing in a manner that allows a user or manufacturer to select the operating voltage of the motor/generator by connecting adjacent layers in a selected angular orientation with respect to each another. If the user or manufacturer selects an orientation in which the conductors of adjacent layers are electrically connected in parallel, the operating voltage will be lower than if the user or manufacturer selects an orientation in which the conductors of adjacent layers are electrically connected in series. Thus, the user or manufacturer may connect the casings in various combinations of angular orientations to select one of a number of voltages at which the motor/generator is to operate, such as 120 volts, 240 volts and 480 volts. The exteriors of the casings may be marked with indicia that facilitate the selection of an operating voltage by aligning the indicia and then connecting the casings via the pins.

The present invention also includes a novel method that may be used to mount the magnets during manufacture of the motor. In accordance with this method, a magnet is dynamically balanced on the shaft on which it is mounted by hardening a thin ring of liquid material between the magnet and the shaft (or a hub mounted to the shaft) while the shaft is spun. The material may be, for example, a polymer resin that is cross-linked and thus hardened by exposure to ultraviolet light while the shaft is spun.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
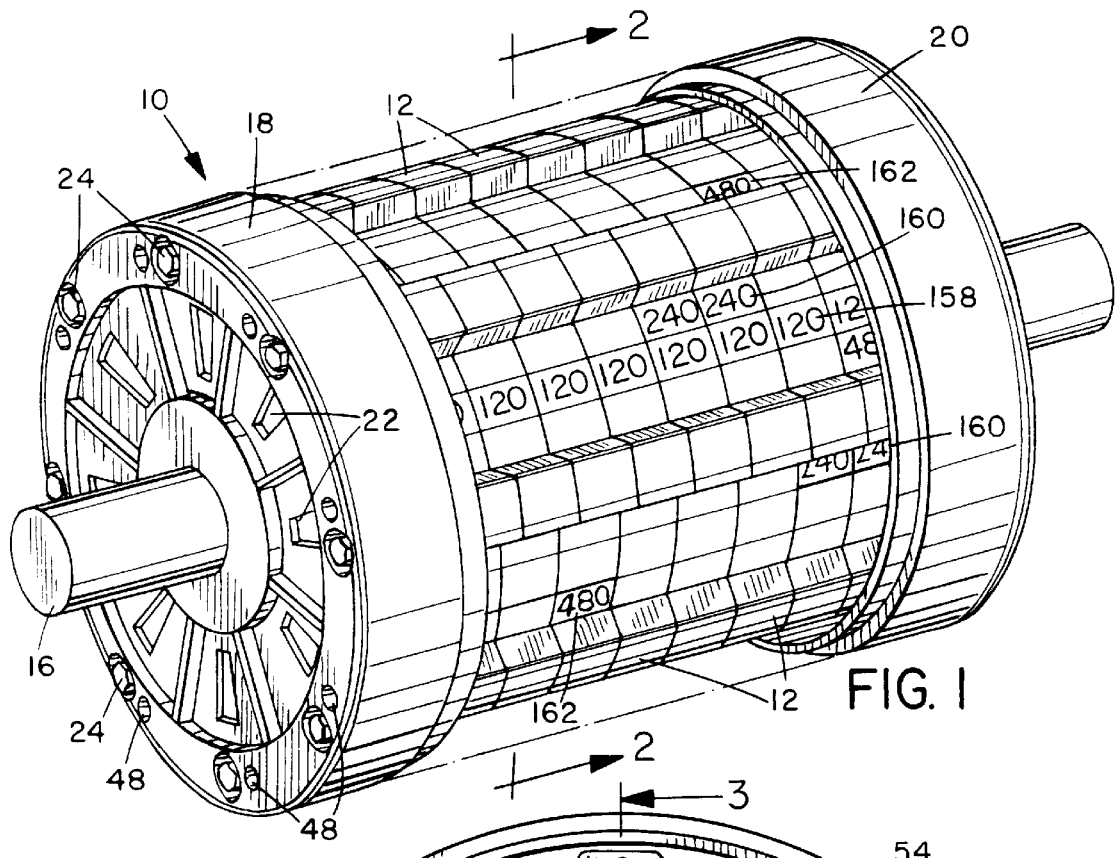
FIG. 1 is a pictorial view of an exemplary motor/generator of the present invention.
Figure 2:
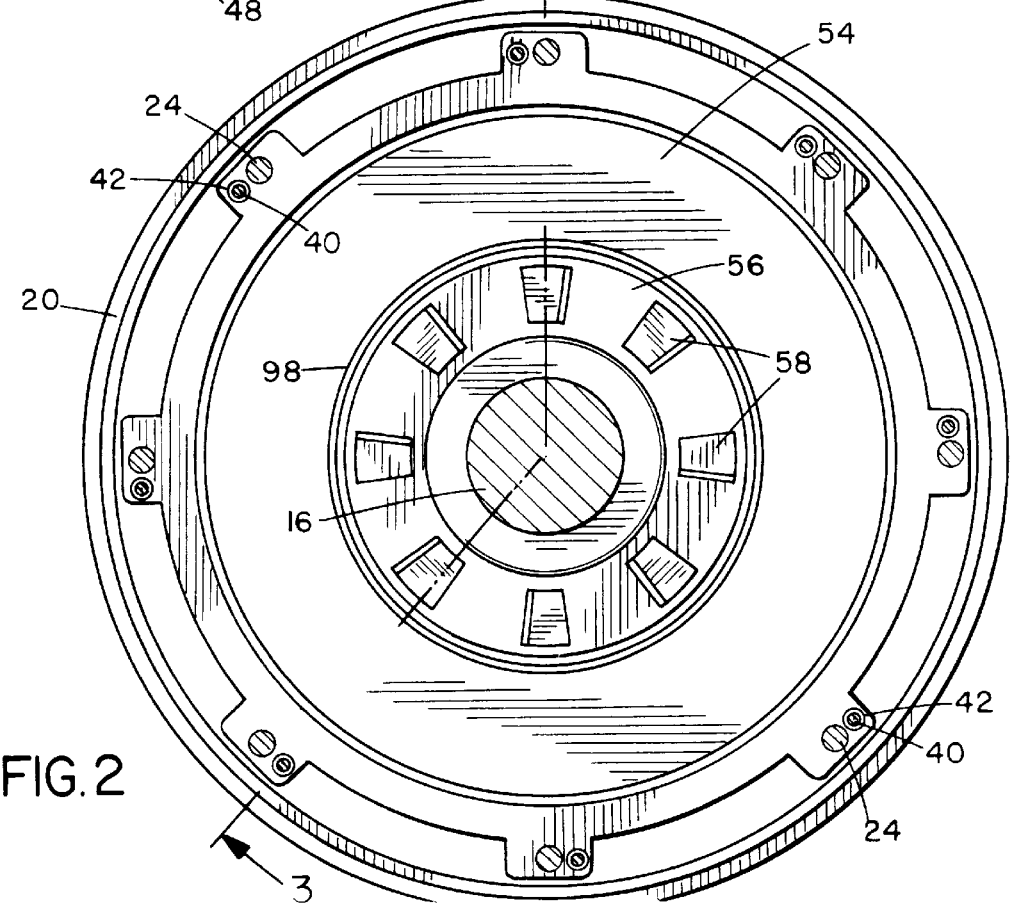
FIG. 2 is an enlarged sectional view taken on line 2—2 of FIG. 1.
Figure 3:
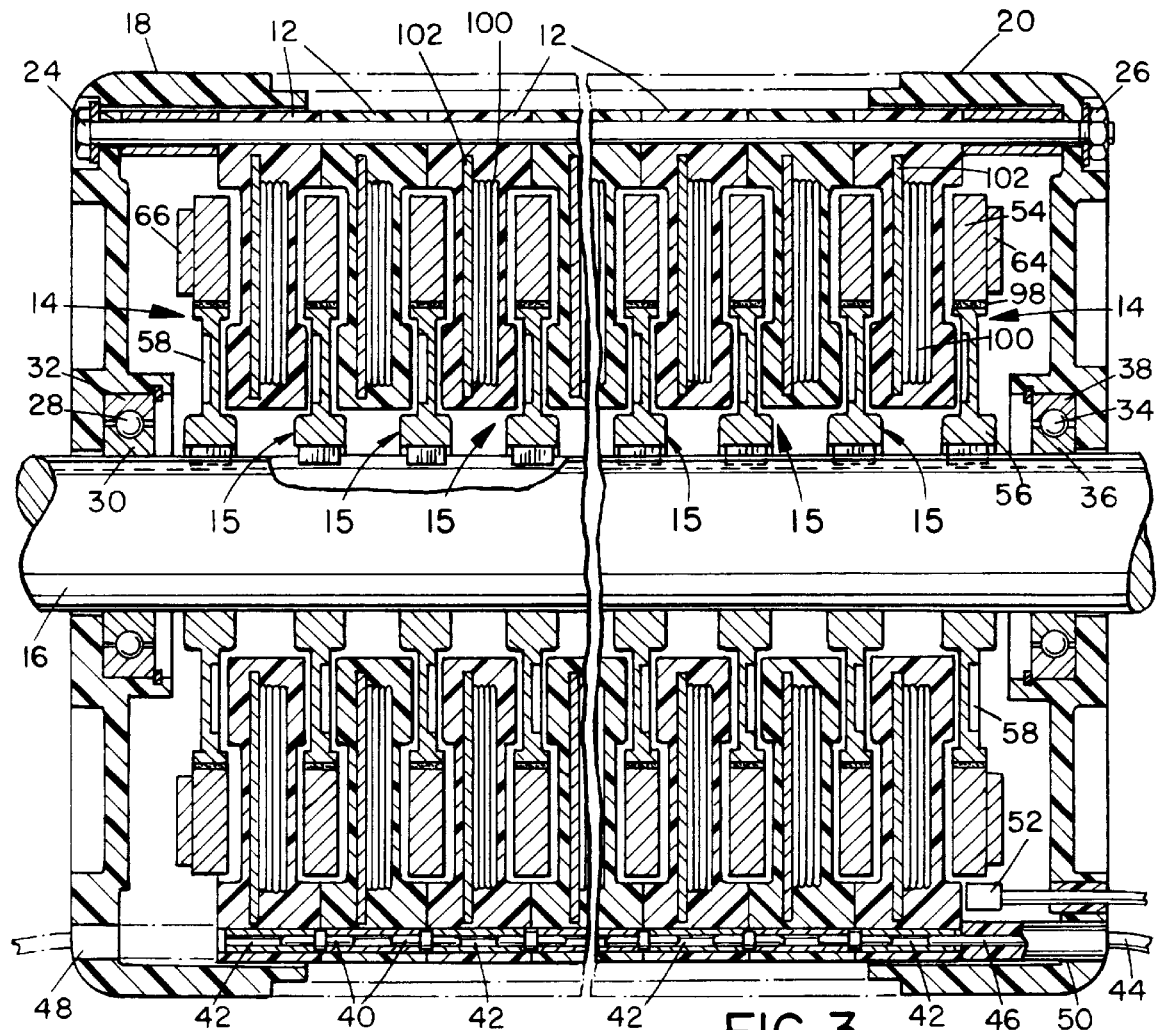
FIG. 3 is a sectional view taken on line 3—3 of FIG. 2.

As illustrated in FIGS. 1–3, a motor/generator includes a housing 10 (the center section of which is shown removed), multiple layers or stator assemblies 12 connected to one another and disposed within housing 10, and a rotor having multiple rotor discs 14 connected to a shaft 16 that extends axially through housing 10. Housing 10 includes two endpieces 18 and 20, each having multiple housing ventilation openings 22. Housing 10 also includes at least one removable midsection piece between endpieces 18 and 20 that is indicated in phantom line in FIGS. 1–3 but not shown for purposes of clarity. Endpieces 18 and 20 and the removable midsection pieces are preferably made of light-weight plastic. Bolts 24 extend from endpiece 18 axially through housing 10 through each stator assembly 12 and are secured by nuts 26 at endpiece 20. At one end of housing 20, ball bearings 28 retained between a first bearing race 30 connected to shaft 16 and a second bearing race 32 connected to endpiece 18 facilitate rotation of shaft 16 with respect to housing 10. A similar bearing arrangement having ball bearings 34 retained between a first bearing race 36 connected to shaft 16 and a second bearing race 38 connected to endpiece 20 facilitate rotation of shaft 16 at the other end of housing 10.

1. Modular Construction of the Motor/Generator

Rotor discs 14 are interleaved with stator assemblies 12. Although stator assemblies 12 are described in further detail below, it should be noted that stator assemblies 12 are removably connectable to one another. A motor/generator having any selected number of stator assemblies 12 may be constructed. Stated another way, the motor/generator has a stator comprising a selected number of layers. Preferably, for reasons discussed below, the motor/generator has at least two stator assemblies 12 and three rotor disks 14. Removable pins 40 plug into sockets 42 to electrically connect each stator assembly 12 to an adjacent stator assembly 12. Electrical power leads 44 extend into housing 10 and have plugs 46 that connect to sockets 42 in one of the two endmost stator assemblies 12. Although FIG. 3 illustrates a power lead 44 connected to the endmost stator assembly 12 adjacent endpiece 20, it could alternatively be connected to the endmost stator assembly 12 adjacent endpiece 18. As illustrated in FIGS. 1 and 3, openings or ports 48 and 50 in endpieces 18 and 20, respectively, admit plugs 46 into housing 10. A sensor 52, which is preferably a Hall-effect sensor, is mounted to endpiece 20. Sensor 52 is adjacent the endmost rotor disc 14 for sensing pole transitions, as described below with respect to the operation of the motor/generator.

2. The Rotor

Figure 4:
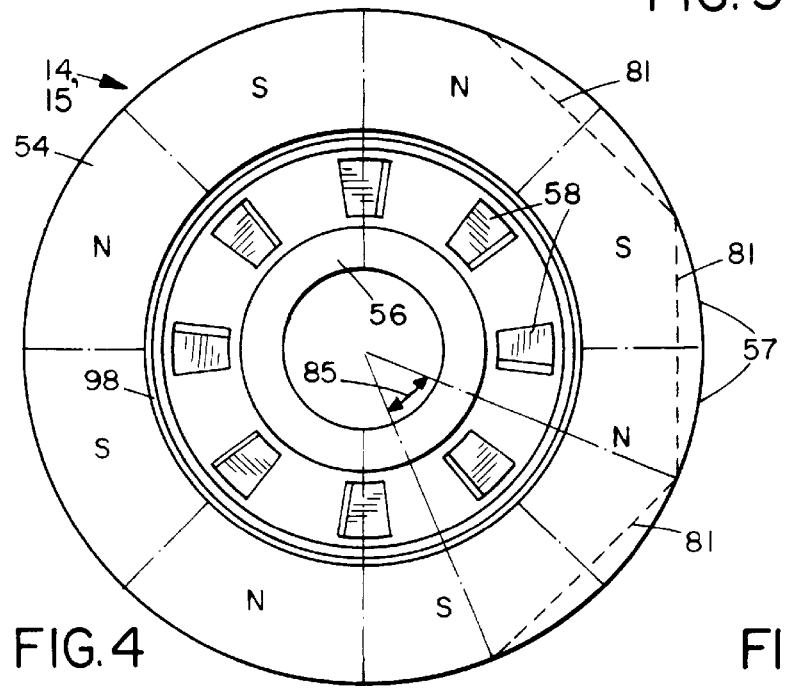
FIG. 4 is a face view of a rotor of the motor/generator, showing the polarization of the magnet.
Figure 5:
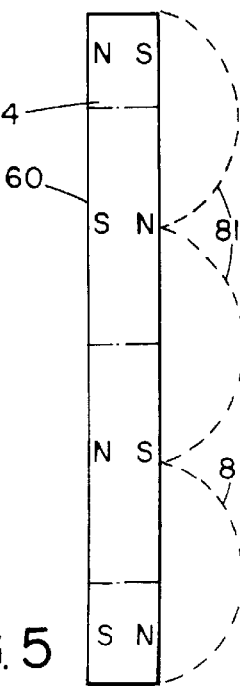
FIG. 5 is a side elevation view of a rotor.
Figure 15:
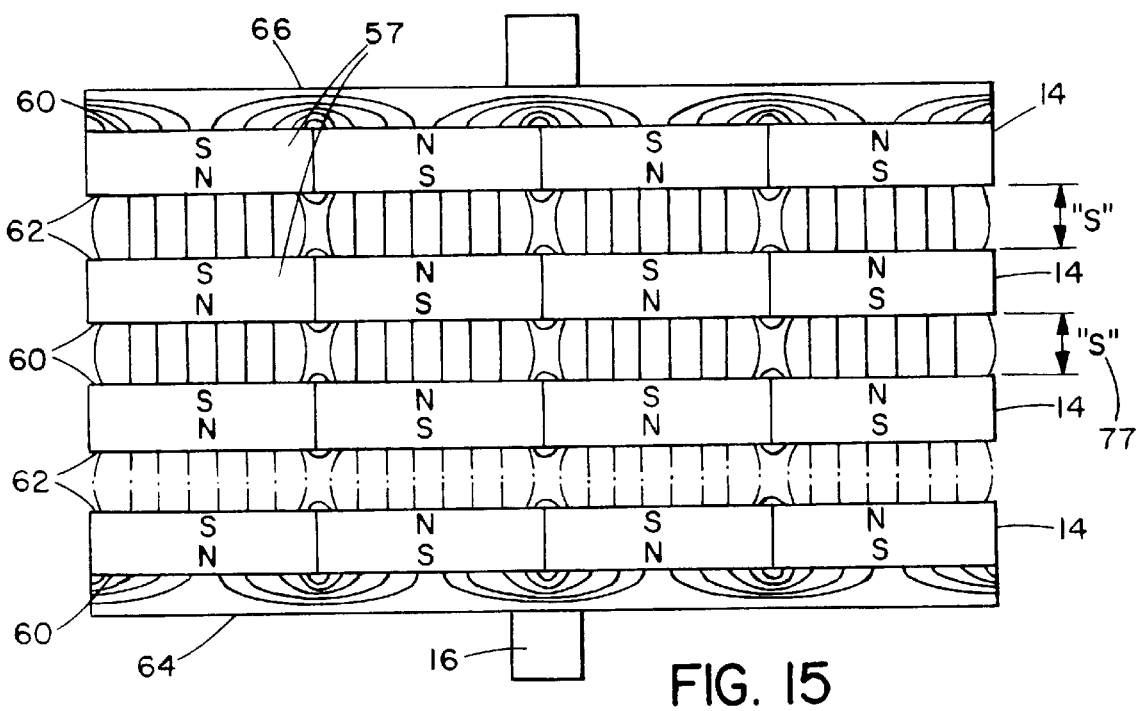
FIG. 15 is a flux diagram of the rotor.

As illustrated in FIGS. 2 and 4, each rotor disc 14 includes an annular ceramic magnet 54 mounted on a hub 56. Hub 56 has hub ventilation openings 58 with angled, vane-like walls for impelling cooling air through housing 10. Magnets 54 may be made from a suitable ferroceramic material, such as M-V through M-VIII, oriented barium ferrite (BaO—6Fe$_6$—O$_2$), strontium ferrite (SrO—6Fe$_6$—O$_2$), or lead ferrite (PbO—6Fe$_6$—O$_2$). Alternatively, magnets 54 may be made from a bonded neodymium material. Such materials have the added advantage of being much lighter than rare earth and iron magnetic materials. Both ferroceramic magnets and bonded neodymium magnets are known in the art and commercially available. As illustrated in FIG. 4, each magnet 54 is polarized to provide multiple sectors 57 uniformly distributed angularly around magnet 54. As illustrated in FIG. 5, each sector is polarized through the thickness of magnet 54. Thus, each sector has opposite poles on opposite faces 60 and 62 of the magnet 54. In addition, the poles of sectors 57 on face 60 alternate with those of adjacent sectors 57 on face 60, and the poles of sectors 57 on face 62 alternate with those of adjacent sectors on face 62. Each rotor disc 14 is mounted on shaft 16 with the poles of its magnet 54 axially aligned with opposite poles of an adjacent magnet 54 (i.e., a North pole on face 62 of a first rotor magnet 54 will be axially aligned with a South pole on face 60 of a second adjacent rotor magnet 54). Magnetic flux therefore exists between such axially aligned poles. As illustrated in FIGS. 3 and 15, annular discs or endplates 64 and 66, made of a suitable high-permeability material such as steel, are mounted to faces 60 of the magnets 54 of the endmost two rotor discs 14. Endplates 64 and 66 contain the magnetic flux between adjacent poles of the rotor magnet 54 adjacent to endplate 64 or 66.

As illustrated in FIG. 15, conceptually, the magnetic flux "flows" from a sector 57 of a first one of the two endmost magnets 54, through axially aligned sectors 57 of adjacent magnets 54 until reaching the second one of the two endmost magnets 54, where one of endplates 64 and 66 directs the flux to an angularly adjacent sector 57. The flux then returns axially through aligned sectors 57 of adjacent magnets 54 until again reaching the first endmost magnet 54, where the other of endplates 64 and 66 directs the flux to an angularly adjacent sector 57. The magnets 54 other than the two endmost magnets 54 may be referred to herein for convenience as inner or center magnets 54. The flux thus follows a serpentine pattern, weaving axially back and forth through aligned sectors 57 of magnets 54.

As noted above, the motor/generator should have at least one inner or center magnet 54 and two outer or endmost magnets 54. Nevertheless, the greater the number of center magnets 54, the greater the ratio of total flux density to total weight of the motor/generator and, correspondingly, the greater the power-to-weight ratio of the motor/generator. Therefore, the motor/generator preferably has at least three or four center magnets 54 and can achieve a power-to-weight ratio of between about 0.1 and 1.0 horsepower per pound (HP/lb.), with a typical power-to-weight ratio of about 0.5 HP/lb. With this number of center magnets 54 it can achieve an efficiency between about 88 percent and 99 percent, with a typical efficiency between 92 and 96 percent. The motor/generator can achieve the high flux density-to-weight ratio because essentially every point or magnetic domain within each center magnet 54 contributes to the total flux. Conceptually, flux emanating from a domain midway between faces 60 and 62 (FIG. 15) of a center magnet 54 impinges equally upon both adjacent stator assemblies 12. In a conventional axial field motor, the flux emanating from each magnet is directed to only one stator winding. Thus, in the conventional axial field motor, the domains closer to the winding contribute more flux than the domains farther from the winding.

Figure 6:
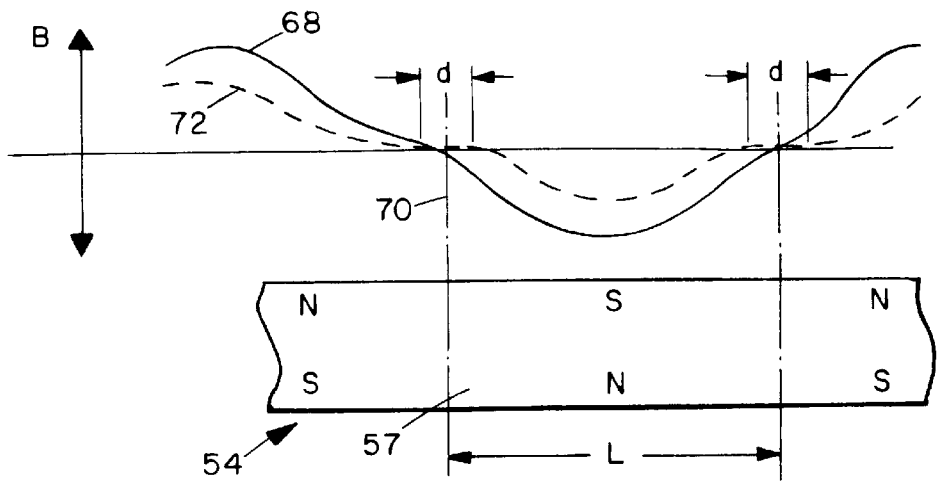
FIG. 6 is a graphical illustration of the magnetic flux emanating from a rotor.

Magnets 54 have more than two poles to minimize demagnetization before they are assembled into the rotor. The greater the number of poles, the less demagnetization a magnet 54 will experience because the length of the flux lines between adjacent poles will be minimized. While it is difficult if not impossible to create pole transitions in high-permeability material, e.g., iron, steel, Alnico and samarium-cobalt materials, which have permeabilities thousands of times that of air, pole transitions are readily created in low-permeability materials, such as ferroceramic and bonded neodymium materials, which having permeabilities on the order of that of air. Nevertheless, any material having a permeability no more than about 100 times that of air would be suitable for magnets 54. As illustrated in FIG. 6, the flux density (B) curve 68 transitions sharply at the midpoint 70 between poles of a magnet 54. In contrast, the flux density (B) curve 72 of a high-permeability magnet (not shown) would transition very gradually, thereby defining poles that are less distinct than those of a ferroceramic magnet. The transition area, "d", is defined as the area in which the magnetic flux emanating from a pole returns to a laterally adjacent pole on the same magnet 54 rather than travels to an axially adjacent pole of an axially adjacent magnet 54.

Figure 7:
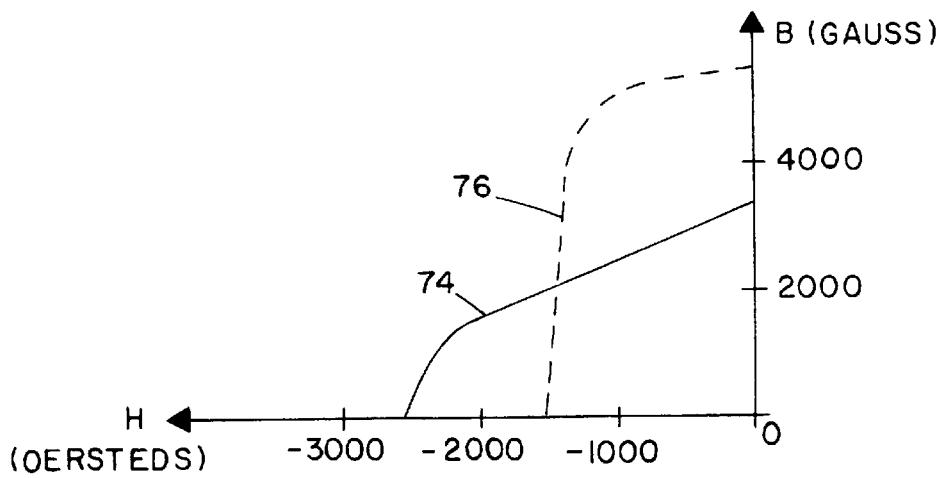
FIG. 7 is a plot of magnetic flux of the magnetic flux versus the coercivity of a magnet.

The number of poles in magnets 54 and the spacing between magnets 54 along rotor shaft 16 (see FIG. 15) is preferably determined in response to the magnetization characteristics of the ceramic material. As illustrated in FIG. 7, an exemplary characteristic curve, sometimes referred to as a "B–H curve" 74, is defined by a plot of flux density (B) versus coercivity (H) of magnet 54. A similar B–H exemplary curve 76 for a high-permeability magnet is shown for comparison. It should be noted that curves 74 and 76 each include two relatively flat portions of differing slopes connected at a "knee."

Figure 8:
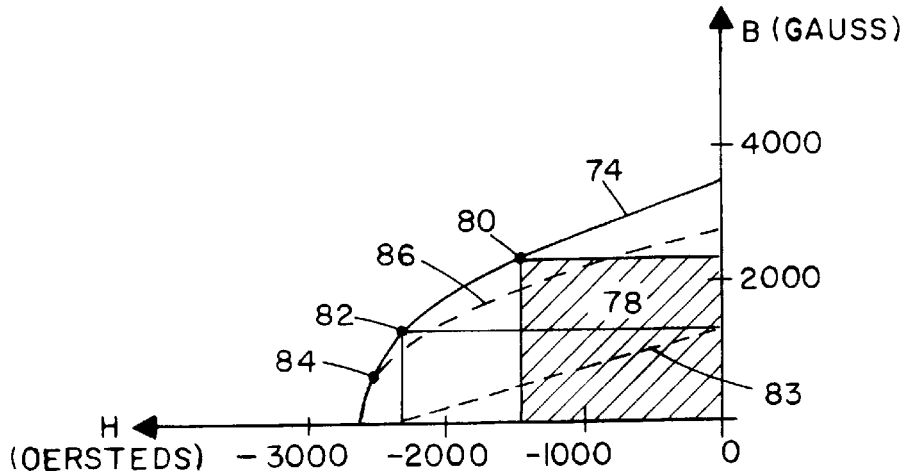
FIG. 8 is a plot similar to FIG. 9, showing magnetic flux versus coercivity of a magnet of the motor/generator.

As illustrated in FIG. 15, and with reference to FIG. 8, the spacing 77 between adjacent magnets 54 on rotor shaft 16 is preferably selected to maximize the energy product 78, which is defined as the product of flux density and coercivity at a point on B–H curve 74. (Flux density, expressed in units of Gauss, multiplied by coercivity, expressed in units of Oersteds, is equal to energy, expressed in units of Joules.) Energy product 78 is maximized when magnets 54 operate at exemplary point 80 on B–H curve 74. Because the demagnetizing force or coercivity (H) of a magnet 54 is proportional to spacing 77, and the flux density (B) of a magnet 54 is proportional to its thickness, spacing 77 of a magnet 54 operating at point 80 can be calculated by dividing the thickness of magnet 54 by the slope of B–H curve 74 at the portion of the curve near the B axis that is relatively flat. For the preferred ferroceramic materials, the slope at this portion of their B–H curve is approximately equal to one; thus, energy product 78 is maximized when magnets 54 are spaced by a distance equal to their thickness.

Spacing 77 can also be described in relation to the width of the transition zone (d) between adjacent poles of a magnet 54. (See FIG. 6). As described above, in the transition zone, magnetic flux emanating from a pole returns to an adjacent pole on the same magnet 54 and does not travel to a pole of an adjacent magnet 54, because the length of each flux line in the transition zone is shorter than the axial distance between that point and a point on an adjacent magnet 54. Thus, the length of a flux line spanning the transition zone is essentially equal to spacing 77. Because flux lines returning to an adjacent pole of the same magnet 54 are essentially semicircular in air, the length of a flux line spanning the transition zone is equal to one-half the circumference of a circle having a diameter that is the width of the transition zone. Therefore, the width of the transition zone is twice spacing 77 divided by pi ($\pi$).

As illustrated in FIG. 4, and with reference to FIG. 8, the number of sectors 57 (or, equivalently, the number of poles) is preferably selected to operate magnets 54 exactly at the knee of their B–H curve 74, indicated by point 82, prior to assembling magnets 54 into the rotor. Because the demagnetizing force or coercivity (H) of a magnet 54 is proportional to the length of its longest flux lines, and the flux density (B) of a magnet 54 is proportional to its thickness, the length of the longest flux lines 81 of a magnet 54 operating at point 82 can be calculated by determining the slope of a diagonal 83 of a box having a corner at point 82, and then dividing the thickness of magnet 54 by this slope. The longest flux lines 81 extend between points substantially at the centers of adjacent sectors 57 at the outer peripheries of sectors 57. Because flux lines returning to an adjacent pole of the same magnet 54 are essentially semicircular in air, the distance or chord between such center points is equal to twice the length of the longest flux lines 81 divided by pi ($\pi$). (Viewed from the top, as in the plan view of FIG. 4, the longest flux lines 81 appear coextensive with such chords.) The angle 85 subtended by such a chord divided into 360 degrees is equal to the preferred number of sectors 57. The exemplary magnet 54 shown in FIG. 8 has eight sectors 57, each subtending an angle of 45 degrees.

By operating magnets 54 at the knee prior to assembly, the flux between each pole of a magnet 54 and the axially aligned pole of an adjacent magnet 54 is maximized when the rotor is assembled. A greater number of poles would increase the flux density between the angularly adjacent poles of a magnet 54 and correspondingly decrease the flux between axially adjacent magnets 54. A lesser number of poles would move the operating point beyond the knee to, for example, point 84. Once the operating point of a magnet has moved beyond the knee of its characteristic B–H curve, it becomes permanently demagnetized to some extent and thereafter operates on a minor B–H curve 86.

Figure 9:
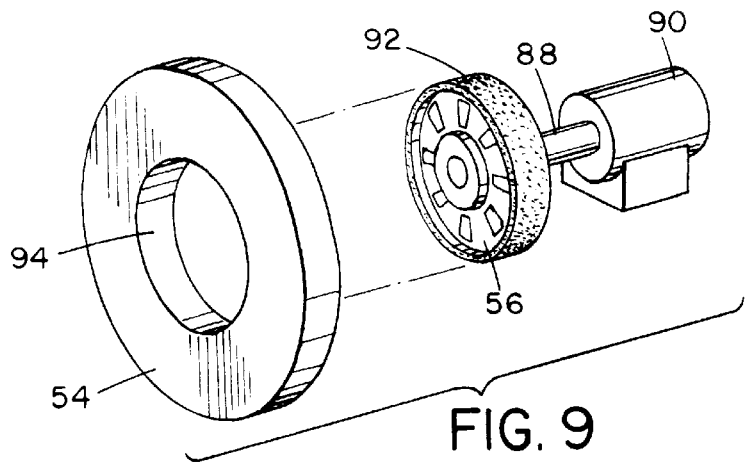
FIG. 9 is a pictorial view of a method for assembling a rotor by mounting a magnet on a hub.
Figure 10:
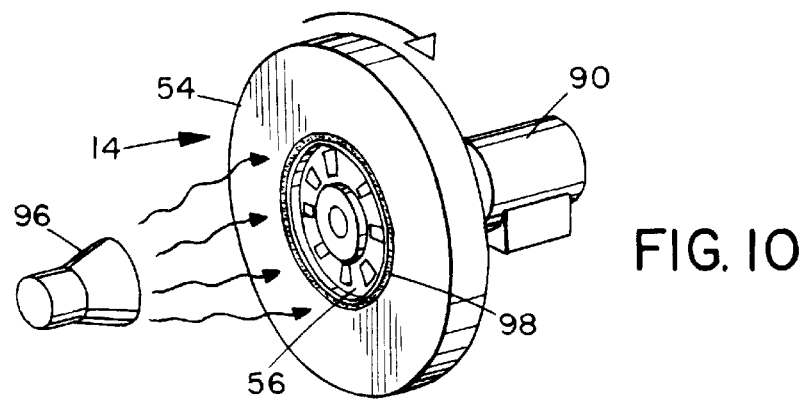
FIG. 10 is a pictorial view of a method for curing the material that adheres the magnet to the hub.

As illustrated in FIG. 9, a novel method may be used to mount magnets 54 to a hubs 56. As those of skill in the art will appreciate, annular ceramic magnets typically are not precisely uniform as a result of the casting and kilning method by which they are made. Thus, their centers of gravity are typically not located precisely at their centers. It is therefore desirable to balance each magnet 54 to minimize vibration and mechanical stresses during operation of the motor/generator. Nevertheless, it would be difficult to balance magnets 54 by removing material from them because ceramic materials are difficult to machine. It would also be difficult to balance magnets 54 by attaching weights or bands to their peripheries due to the differential thermal expansion between the ceramic and the weights. In accordance with the novel method, hub 56 is removably mounted on a shaft 88 connected to a motor 90. Cross-linkable polymer resin, such as the well-known type that is commercially available for dental repair, is applied to either the outer rim 92 of hub 56, the inner rim 94 of magnet 54, or both. Magnet 54 is then fit onto hub 56. Motor 90 is energized to slowly increase its speed. Hub 56 rotates magnet 54 because the relatively high viscosity of the resin creates sufficient friction or adhesion between them. The rotation dynamically balances magnet 54 on hub 56 because the resin flows and redistributes itself in the space between hub 56 and magnet 54. As illustrated in FIG. 10, when magnet 54 is rotating smoothly with no noticeable vibration, an ultraviolet lamp 96 is energized to illuminate the resin. As is well-known in the art, ultraviolet light cross-links the polymer molecules and thereby hardens the resin. Magnet 54 remains balanced while the resin hardens because it remains spinning with hub 56. When the resin is sufficiently hardened, lamp 76 and motor 70 are de-energized. The resulting rotor disc 14, comprising magnet 54 adhered to hub 56 by a layer of hardened resin 98, is then removed from shaft 68.

3. The Stator

Figure 11:
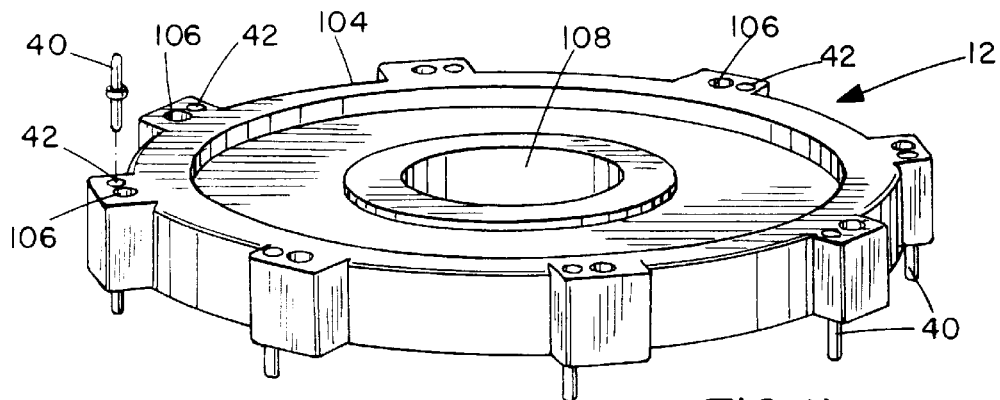
FIG. 11 is a pictorial view of a stator of the motor/generator.
Figure 12:
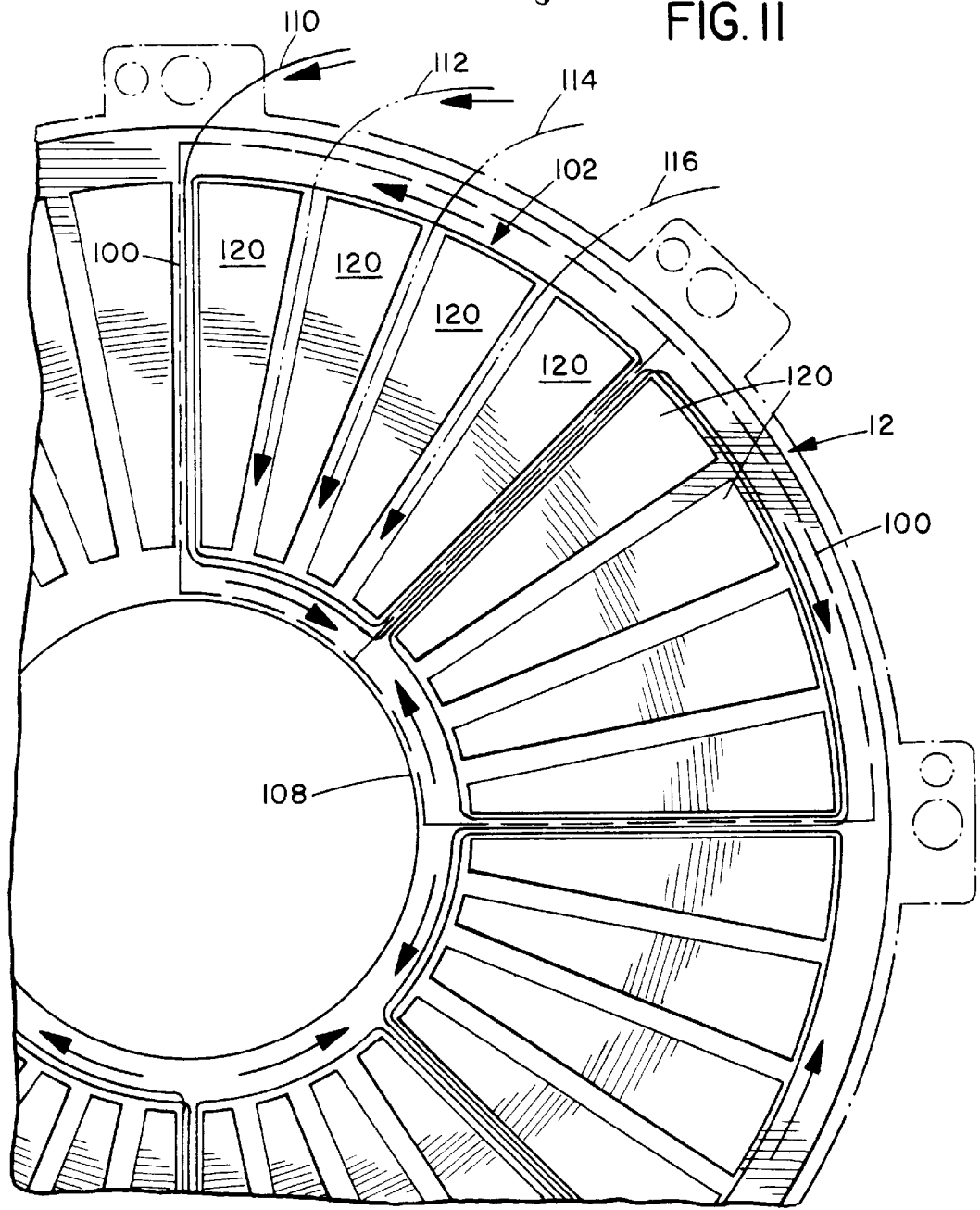
FIG. 12 illustrates a stator winding arrangement having multiple turns of wire conductors.

As described above, the stator of the motor/generator includes multiple stator assemblies 12. As best illustrated in FIGS. 3, 11 and 12, one embodiment of a stator assembly 12 includes windings 100 around a dielectric form 102 that is embedded, molded or similarly encased in a substantially annular stator casing 104 made of a suitable dielectric material. Stator assembly 12 has bores 106 through which bolts 24 may be extended to physically interconnect them, as described above with respect to FIGS. 1 and 2. As similarly described above, stator assembly 12 has sockets 42 that may be electrically interconnected by removable pins 40. Stator casing 104 has a central opening 108 through which shaft 16 extends when the motor/generator is assembled, as illustrated in FIG. 2. The diameter of shaft 16 is less than that of central opening 108 to facilitate airflow through the motor/generator.

Figure 13:
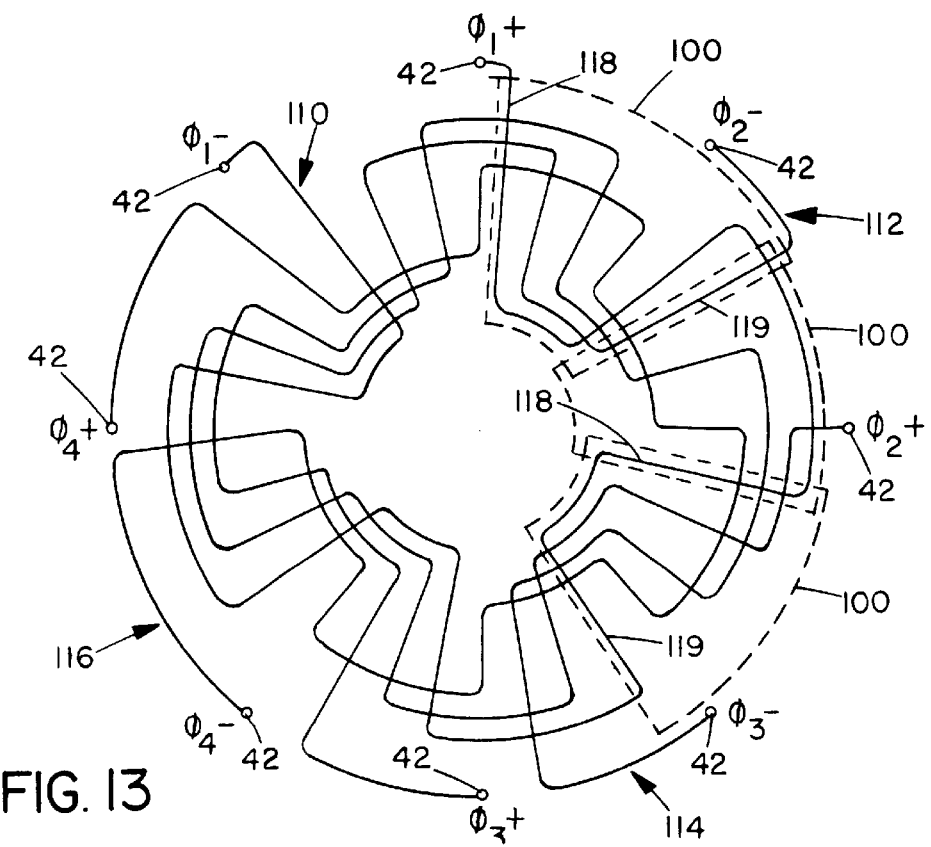
FIG. 13 is a schematic diagram of the stator winding arrangement.

As illustrated in FIG. 13, the exemplary motor/generator has four phases, designated phase-1 ($\phi_1$), phase-2 ($\phi_2$), phase-3 ($\phi_3$) and phase-4($\phi_4$). Each phase is defined by a conductor phase assembly, comprising a length of a suitable conductor 110, 112, 114 and 116, respectively, such as dielectric-coated copper or aluminum magnet wire of a suitable gauge, electrically connected at each end to a socket 42. For example, conductor 110 is connected between a socket 42, designated phase-1 positive ($\phi_1+$) and a socket 42 designated phase-1 negative ($\phi_1-$).

Although a motor/generator having four phases is illustrated, the number of phases is preferably selected in response to the length of the transition area between the poles of magnet 54. Referring briefly to FIG. 6, the motor/generator preferably has a number of phases equal to the length ("L") of the outer periphery of a sector 57 divided by the length ("d") of the transition area. The number of phases is, in effect, the number of transition areas that fit within a sector 57. If magnets 54 are spaced by the preferred distance of twice the length ("d") of the transition zone between poles, as described above with respect to FIG. 6, the preferred number of phases is:

$$\text{phases} = \frac{2\pi r}{d * N}$$

where "$2\pi r$" is the circumference of magnet 54, and "N" is the number of sectors 57.

Each conductor phase assembly includes eight windings 100 distributed around form 102. As defined herein, the term "winding" broadly refers to a conductor having at least one portion oriented or elongated in a direction that traverses or cuts the flux lines when the motor/generator is in operation. FIG. 13 illustrates windings 100 having one such elongated conductor portion 118 that extends from the periphery of the conductor phase assembly toward the interior of the conductor phase assembly and another such elongated conductor portion 119 that returns from the interior of the conductor phase assembly to the periphery. Nevertheless, each winding 100 preferably comprises at least two turns. As used herein, a "turn" is defined as a portion of a conductor that extends from the periphery of the conductor phase assembly toward the interior and returns from the interior to the periphery. As those of skill in the art will understand, the number of turns depends upon the selected voltage and current operating parameters. For purposes of clarity, however, two of the turns of each winding 100 of conductor 110 are shown in FIG. 12.

Form 102 has 32 sector-shaped or wedge-shaped partitions 120. Each group of four adjacent partitions 120 corresponds in size to a sector 57 of magnet 54 (FIG. 4). The turns of each winding 100 are wound around such a group of four adjacent partitions 120, and then an equal number of turns are wound around an adjacent group of four adjacent partitions 120. In this manner, the conductor is wound around each of eight groups of four partitions 120. Each of conductors 110, 112, 114 and 116 is wound in this manner. The windings of conductor 110 are offset by one partition 120 from the windings of conductor 112; the windings of conductor 112 are offset by one partition 120 from the windings of conductor 114; and the windings of conductor 114 are offset by one partition 120 from the windings of conductor 116. The completed four phases of windings define a generally planar or wheel-like structure on the surface of form 102, with a total of 32 elongated conductor portions 118 and 119, each consisting of a bunch or group of wires, arranged in a spoke-like manner.

Figure 14:
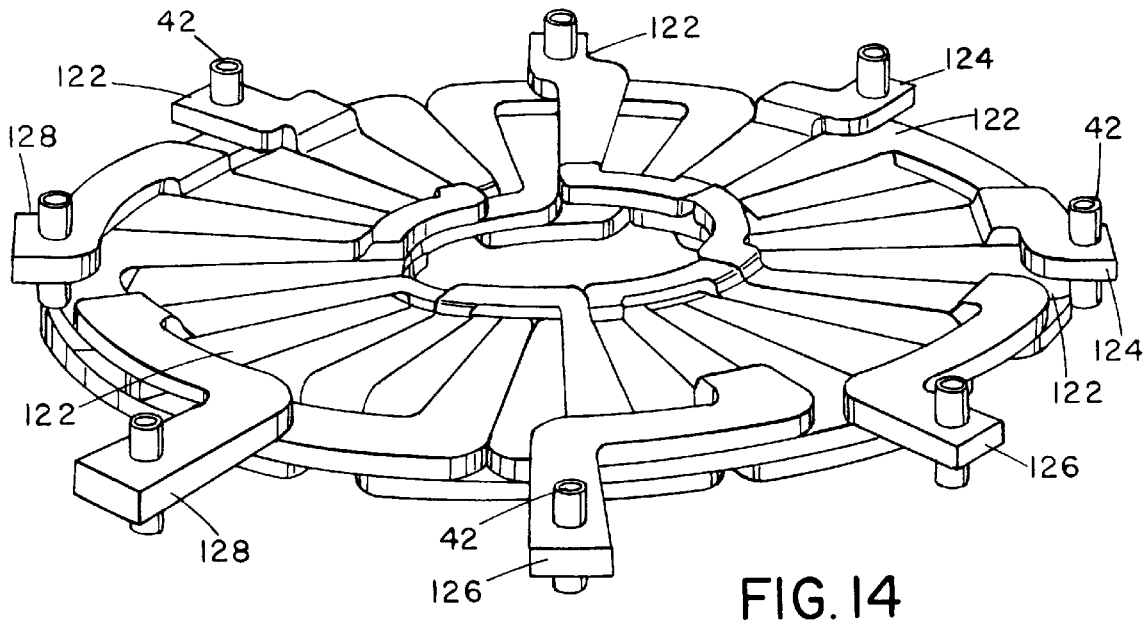
FIG. 14 is a pictorial view of an alternative stator winding arrangement having single-turn, rectangular cross-section conductors.

As illustrated in FIG. 14, in an alternative embodiment, each of four dielectric-coated conductors 122, 124, 126 and 128, defining phases 1–4, respectively, has a rectangular cross-sectional shape. Thus, the cross-section of each of conductors 122, 124, 126 and 128 has a width and a thickness. Although in both this embodiment and the embodiment described above, the windings are electrically connected in the manner schematically illustrated in FIG. 13, in this embodiment the windings are also physically arranged in a manner similar to that illustrated in FIG. 13. In other words, each of conductors 122, 124, 126 and 128 has eight windings, each having exactly one turn, and each offset from an adjacent winding by four conductor widths. The windings of conductor 122 are offset by one conductor width from the windings of conductor 124; the windings of conductor 124 are offset by one conductor width from the windings of conductor 126; and the windings of conductor 126 are offset by one conductor width from the windings of conductor 128. The arrangement is thus analogous to that of the embodiment described above. The four phases of windings define a generally planar or wheel-like structure, with a total of 32 elongated conductor portions arranged in a spoke-like manner.

The elongated portions of conductors 122, 124, 126 and 128 are tapered or wedge-shaped, i.e., their widths decrease in a radially inward direction, thereby allowing them to be packed closely together in the spoke-like arrangement. Conductors 122, 124, 126 and 128 are preferably made of metal cast or otherwise formed into the illustrated winding shape, but it may also be suitable to wind rectangular or square tapered metal wire into the illustrated winding shape. Packing conductors 122, 124, 126 and 128 closely together maximizes the amount of their conductive material that passes through the flux. The ratio of this amount to the total amount of conductive material in the windings of a motor/generator is commonly known as the "fill factor." The fill factor for the stator shown in FIG. 14 is greater than 80 percent. Although the lengths of conductors 122, 124, 126 and 128 are less than the lengths of conductors 110, 112, 114 and 116 in the embodiment described with respect to FIG. 12, the fill factor is much greater in this embodiment. Furthermore, although the cross-sectional area of the wedge-shaped elongated portions of conductors 122, 124, 126 and 128 varies, the average cross-sectional area determines the current capacity. Thus, the minimum width of conductors 122, 124, 126 and 128 does not directly limit their current capacity.

In another alternative embodiment of the stator, each stator assembly comprises multiple layers or laminations, each preferably formed of printed circuit material that has been suitably etched to form the conductor pattern and electrical interconnections between layers described below. The printed circuit material and etching process may be any such material and process known in the art that is commonly used to manufacture printed circuit boards or flexible printed circuits in the electronics industry. The laminations or layers are bonded together or otherwise attached to one another. The resulting multiple-layer printed circuit stator assembly functions in the same manner as stator assembly 12, described above with respect to other embodiments. In that regard, this alternative stator assembly may have any suitable number of phases and any suitable number of windings per phase. The alternative stator assembly may have a thickness as small as about 0.1 inches, thereby facilitating the construction of smaller motor/generators. Nevertheless, a typical alternative stator assembly for a small motor may have a thickness of about 0.25 inches. Larger motors may be constructed using an alternative stator assembly having a thickness as great as about two inches.

Figure 16:
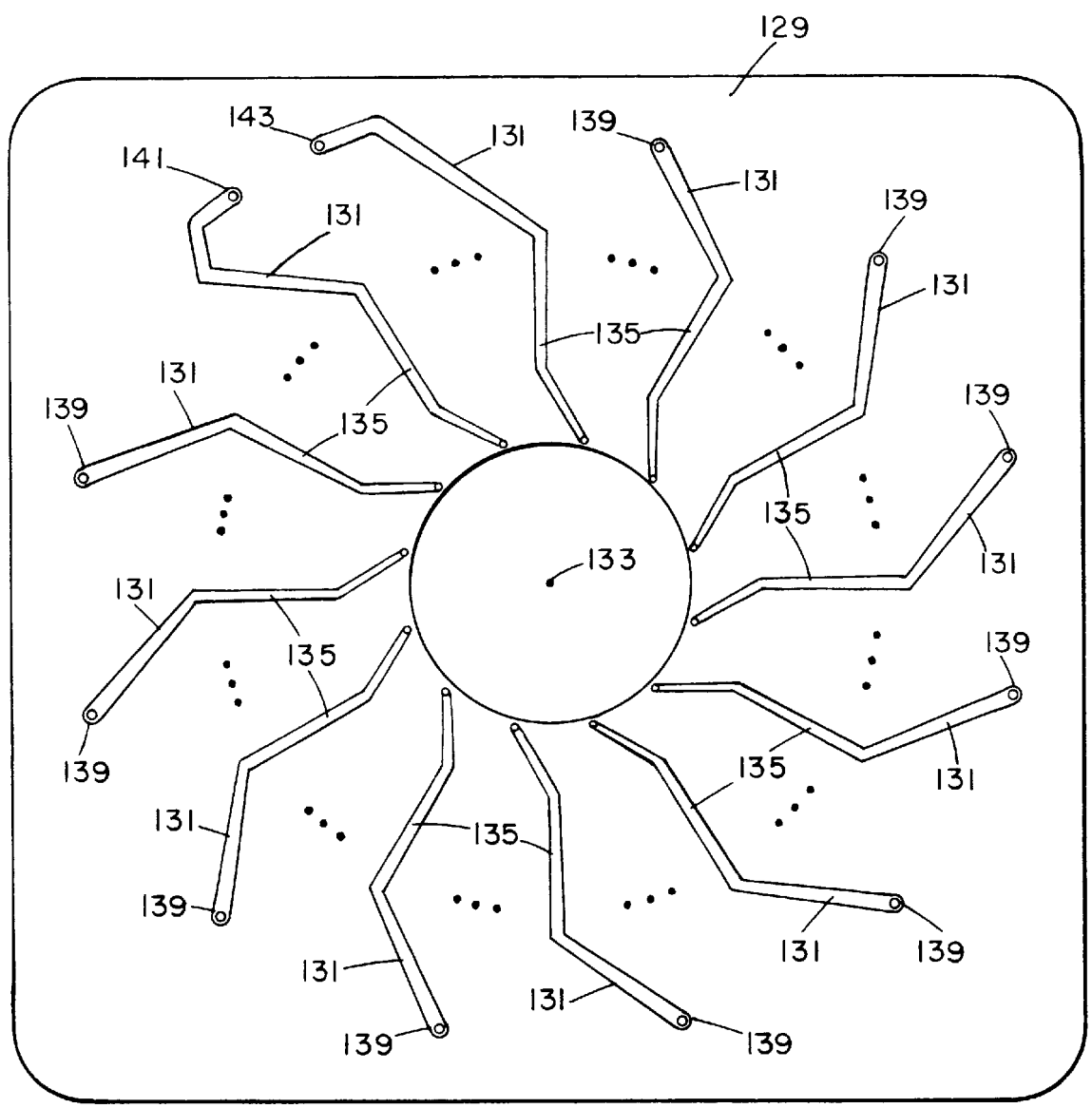
FIG. 16 is a top plan view of a portion of another alternative stator winding arrangement having multiple laminations of two-sided, flexible, printed circuit material, showing the portion of the stator winding arrangement relating to one phase of windings of one of the laminations.

As illustrated in FIG. 16, each layer or lamination of the alternative stator assembly comprises a substrate 129 made of a suitable dielectric material and multiple arms 131 made of metal that remains following the etching or other manufacturing process. The ellipsis (". . . ") between arms 131 indicates that additional arms 131 are included, as described below, but are not shown in FIG. 16 for purposes of clarity. A preferred printed circuit material is a flexible plastic material, commonly referred to as "flex PC," in which substrate 129 is a thin sheet-like plastic to which is bonded a thin layer of copper. Substrate 129 is preferably less than about 0.010 inches (10 mils) thick, and arms 131 are preferably less than about 0.005 inches (five mils) thick. Printed circuit material having a four mil copper layer has been used. The pattern of arms 131 is formed using photolithographic methods well-known in the printed circuit board fabrication industry. Each arm 131 is oriented in a substantially radial direction with respect to an axis 133 normal to substrate 129. Each arm 131 has an elongated conductor portion 135 that is oriented in a radial direction so that a current is induced as it moves through the lines of magnetic flux when the motor/generator is assembled.

Figure 17:
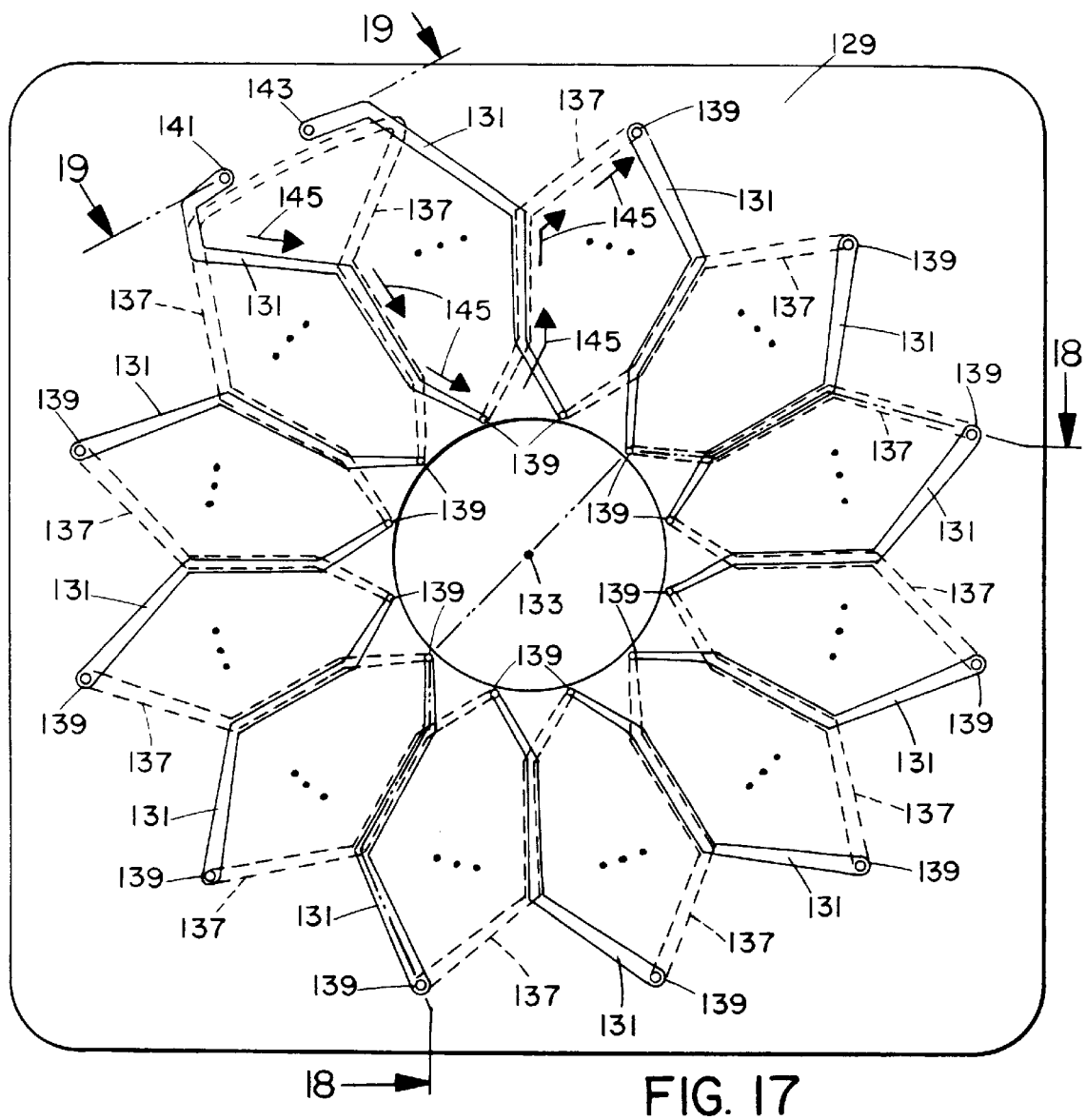
FIG. 17 is a top plan view similar to FIG. 15, but illustrating both sides of one of the laminations.
Figure 18:
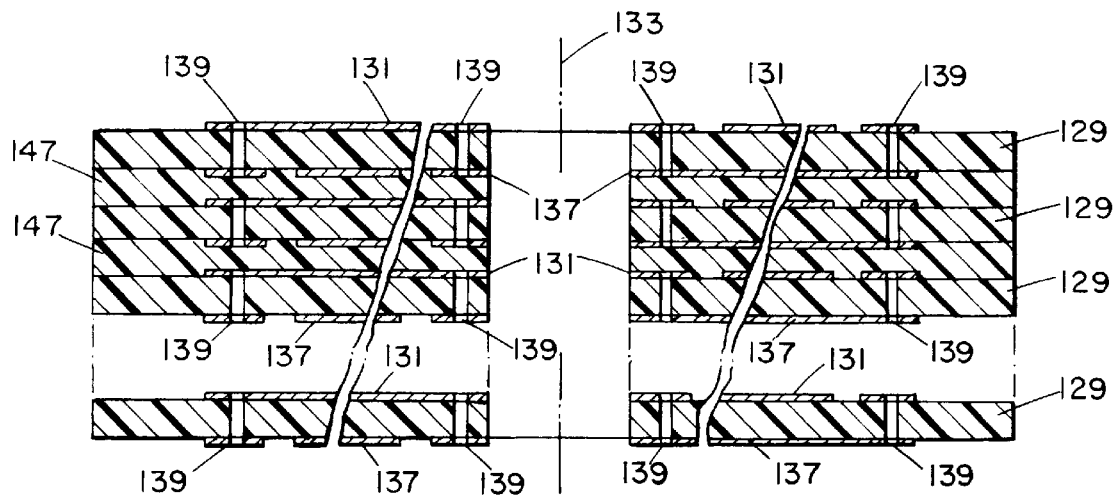
FIG. 18 is a sectional view taken along line 18—18 of FIG. 17, showing the multiple laminations.

As illustrated in FIGS. 17 and 18, each layer or lamination preferably has arms on both sides, in the manner associated with what is commonly known as a two-sided printed circuit board. In FIG. 17, arms 131 on the first side are shown in solid line, and arms 137 on the second side are shown in broken line. Arms 131 and 137 are essentially identical, mirroring one another in size and position. Each end of an arm 131 is electrically connected to an end of an arm 137 via an inter-side through-hole 139. Each inter-side through-hole 139 is plated on its interior to provide a conductive path in the manner well-known in multi-layer printed circuit board manufacture.

A first terminal through-hole 141 is disposed at one end of one of arms 131, and a second terminal through-hole 143 is disposed at one end of another of arms 131. Terminal through-holes 141 and 143 are plated through-holes similar to inter-side through-holes 139, but they do not connect an arm 131 to an arm 137. Rather, terminal through-holes 141 and 143 form the terminals of an electrical circuit. That electrical circuit is the conductor phase assembly or at least a portion of it. It should be noted that the conductor path of the circuit, a portion of which is indicated by arrows 145 in FIG. 17, begins at terminal 141, follows one of arms 131 on the first side of the lamination, changes sides via one of inter-side through-holes 139, and continues through one of arms 137 on the second side of the lamination. The portion of the conductor path indicated by arrows 145 defines a winding. (The winding has only a single turn of conductor, in a manner similar to the embodiment described above with respect to FIG. 14.) The circuit then follows a second winding by again changing sides via another of inter-side through-holes 139, and continues through another of arms 131. The circuit shown in FIG. 17 thus includes six such windings on each side of the lamination.

Figure 19:
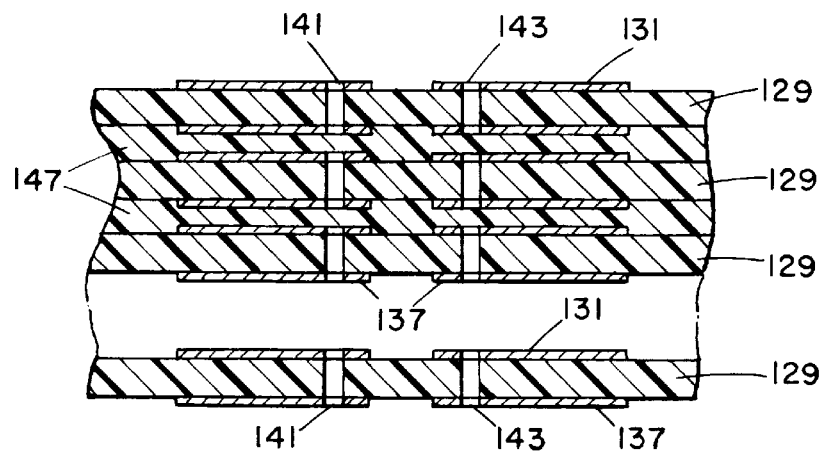
FIG. 19 is a sectional view taken along line 19—19 of FIG. 17.

Although a conductor phase assembly may consist of only the windings of a single lamination, such as that shown in FIG. 17, a conductor phase assembly preferably includes windings of multiple laminations electrically connected in parallel. As illustrated in FIG. 18, the laminations are bonded together to form a stator assembly. A plastic sheet 147 between laminations bonds the laminations together when heated and subjected to pressure, and also electrically insulates arms 137 of one lamination from arms 131 of an adjacent lamination. As illustrated in FIG. 19, terminal through-holes 141 of all laminations are electrically connected together, and terminal through-holes 143 of all laminations are electrically connected together, thereby electrically connecting the windings in parallel to form a conductor phase assembly.

Figure 20:
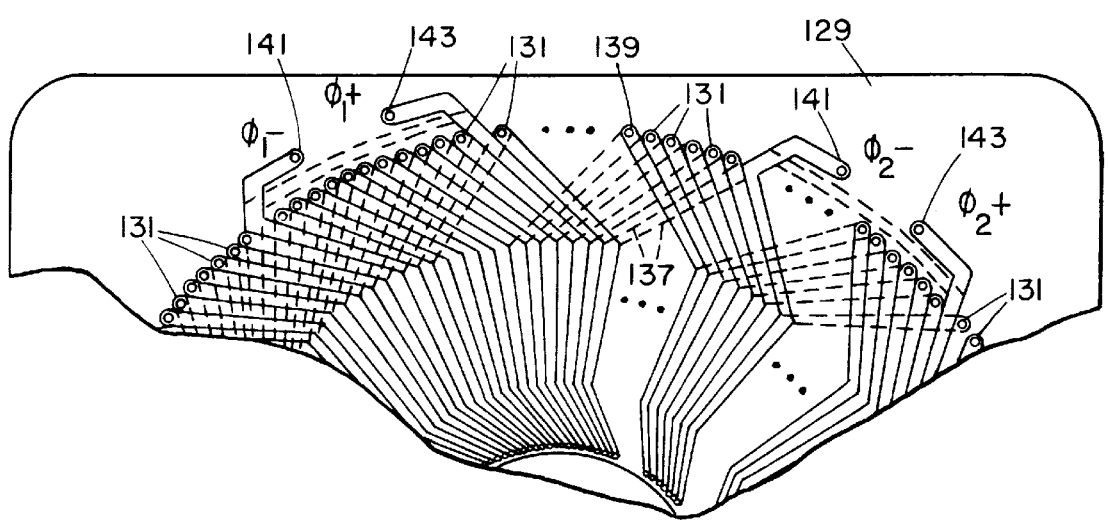
FIG. 20 is a partial top plan view similar to FIG. 17, but showing the portion of the stator winding arrangement relating to 12 phases of windings of one of the laminations.

As illustrated in FIG. 20, the stator assembly preferably includes multiple conductor phase assemblies. The embodiment illustrated in FIG. 20 includes 12 conductor phase assemblies, thereby providing a 12-phase stator assembly. In a 12-phase stator assembly, arms 131 and 137 are arranged at an angular spacing of 2.5 degrees. For purposes of clarity, only a portion of the stator assembly is shown in FIG. 20, illustrating the pair of terminals for phase-1, labeled "$\phi_1^+$" and "$\phi_1^-$", and the pair of terminals for phase-2, labeled "$\phi_2^+$" and "$\phi_1^-$". Nevertheless, the complete stator assembly has 12 pairs of terminals for phases 1–12. To electrically insulate them, arms 131 are separated from one another, and arms 137 are separated from one another, by a small spacing, which is not shown as such in FIG. 20, but rather is represented by the boundary line between adjacent arms 131 and 137 for purposes of clarity.

In view of the embodiments illustrated in FIGS. 12, 14 and 16–20, persons of skill in the art will understand that in other embodiments the conductors may have any suitable size, shape, and number of windings and turns. For example, in an embodiment similar to that illustrated in FIG. 14, each winding may have two turns of rectangular wire having wedge-shaped elongated portions. A conductor may range in size among various embodiments from, for example, a thin printed circuit trace to a thick metal casting.

4. Controlling the Motor/Generator

Figure 21:
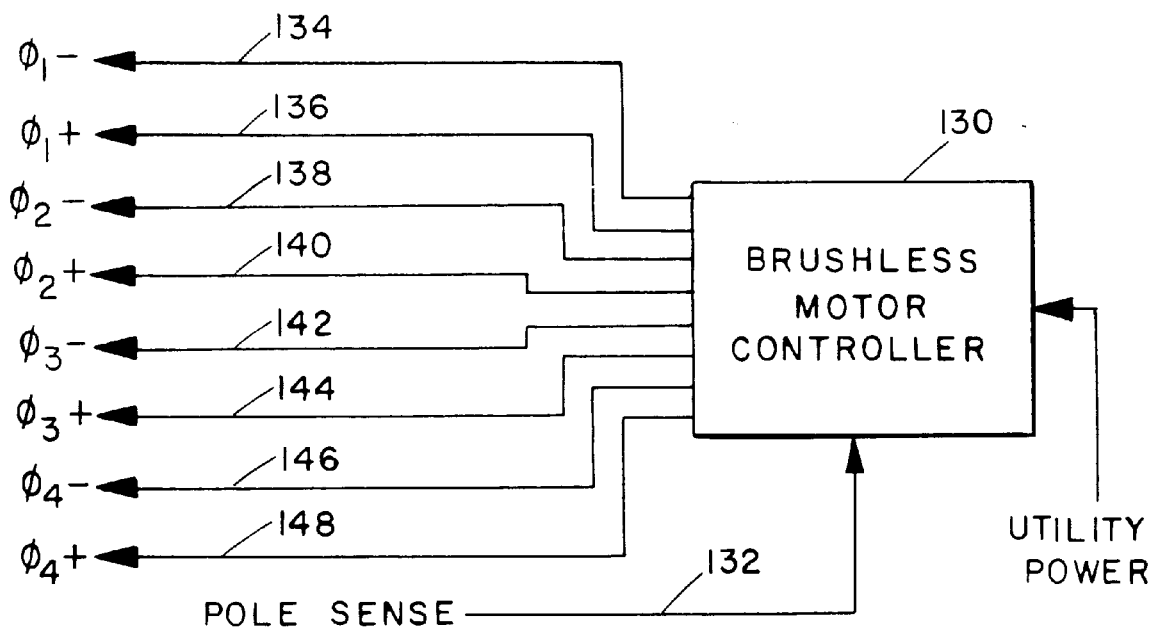
FIG. 21 is a block diagram of a motor controller.

As illustrated in FIG. 21, the motor/generator may be configured as a motor by connecting a brushless motor controller 130 of essentially conventional design. Brushless motor controller 130 receives a pole sense signal 132 from sensor 52 (FIG. 3) and generates signals 134 ($\phi_1-$), 136 ($\phi_1+$), 138 ($\phi_2-$), 140 ($\phi_2+$), 142 ($\phi_3-$), 144 ($\phi_3+$), 146 ($\phi_4-$) and 148 ($\phi_4+$). Signals 134, 136, 138, 140, 142, 144, 146 and 148 are coupled to electrical leads 44, as described above with respect to FIG. 2.

Figure 22:
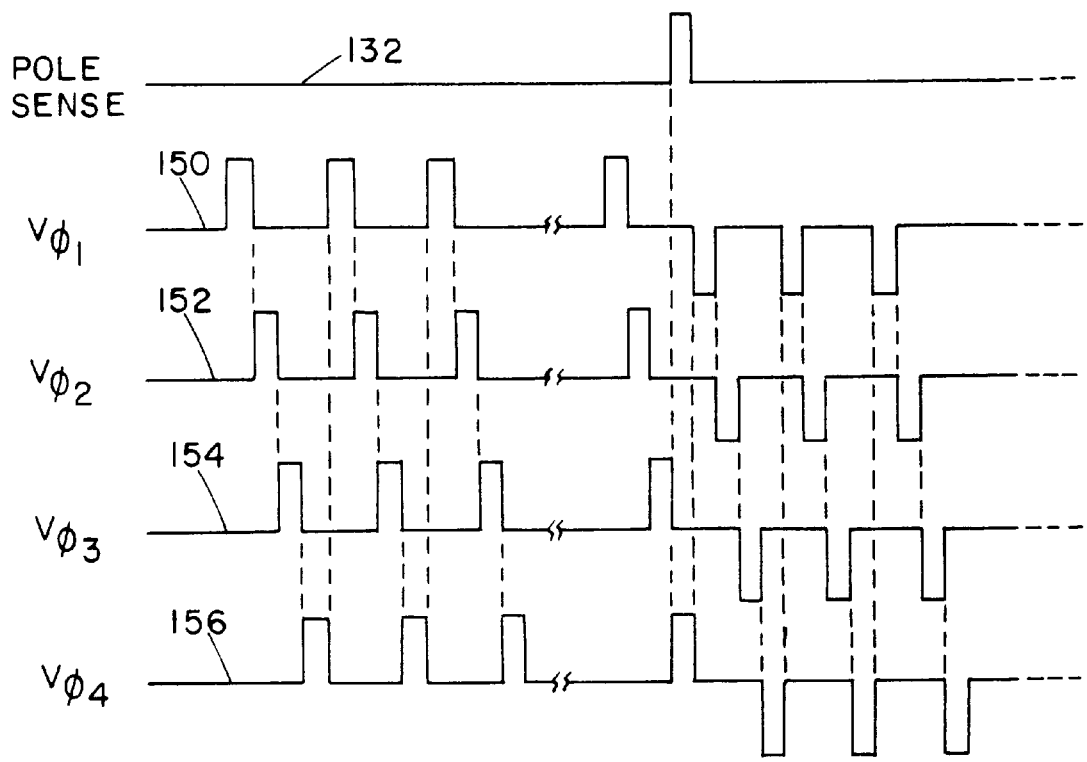
FIG. 22 is a timing diagram of the motor signals.

As illustrated in the timing diagram of FIG. 22, the differential voltage between signals 134 and 136 defines a series of phase-1 pulses 150; the differential voltage between signals 138 and 140 defines a series of phase-2 pulses 152; the differential voltage between signals 142 and 144 defines a series of phase-3 pulses 154; and the differential voltage between signals 146 and 148 defines a series of phase-4 pulses 156. Brushless motor controller 130 may select the width of pulses 150, 152, 154 and 156 to provide suitable motor torque. Brushless motor controller 130 sequentially generates one of pulses 150, 152, 154 and 156. Brushless motor controller 130 repeats this sequence until it receives pole sense signal 132, which indicates that magnets 54 have rotated one pole. At that point, brushless motor controller 130 reverses the voltages of pulses 150, 152, 154 and 156 but continues generating them in the same sequence.

5. Voltage Selection

The modular construction of the motor/generator facilitates selection of an operating voltage. Operating voltage is proportional to the total conductor length for each phase. Thus, an operating voltage may be selected by adjusting the total conductor length for each phase. Each stator assembly 12 has conductors 110, 112, 114 and 116, each defining one of the four phases. (See, e.g., FIG. 13.) By connecting, for example, conductor 110 in each stator assembly 12 in parallel with conductor 110 in all other stator assemblies 12, the total conductor length for phase-1 is minimized. Conversely, by connecting, for example, conductor 110 in each stator assembly 12 in series with conductor 110 in all other stator assemblies 12, the total conductor length for phase-1 is maximized. The modular construction facilitates selectably connecting the conductors of adjacent stator assemblies in either series or parallel.

As illustrated in FIG. 1, each stator assembly 12 has indicia 158, 160 and 162, such as adhesive labels, each indicating one of the voltages that may be selected. An operating voltage can be selected by connecting each stator assembly 12 in an angular orientation in which the indicia indicating a certain voltage are aligned. Indicia 158 are labeled "120" to indicate 120 volts; indicia 160 are labeled "240" to indicate 240 volts; and indicia 162 are labeled "480" to indicate 480 volts. In the exemplary relative angular orientation of stator assemblies 12 shown in FIG. 1, indicia 158 are aligned to select an operating voltage of 120 volts. To change the operating voltage, one need only uncouple one or more stator assemblies 12 and rotate them to realign indicia 158 such that they align to indicate a different operating voltage.

Figure 23:
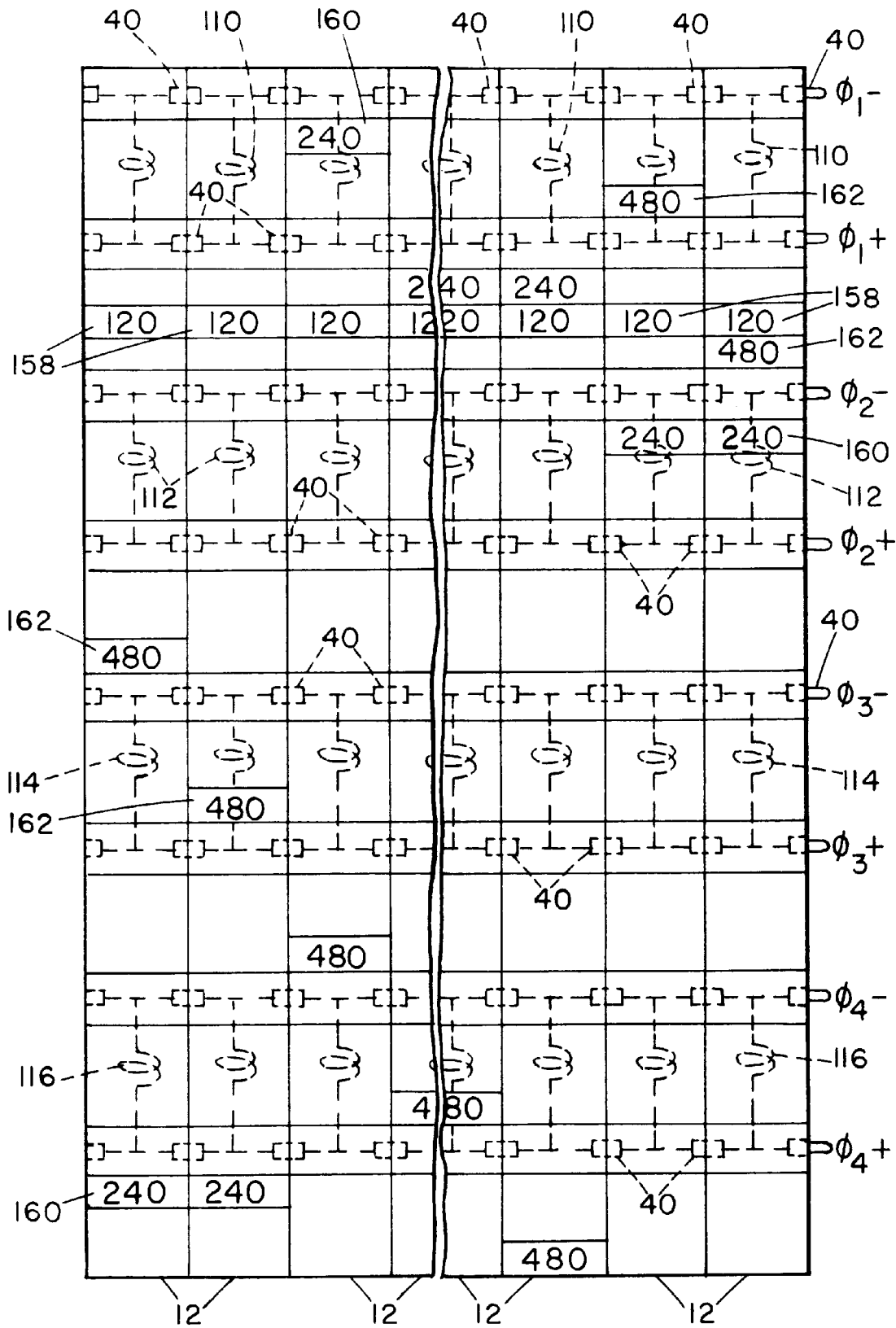
FIG. 23 is a schematic diagram of the stators connected to one another in a configuration selected to operate the motor/generator at a first voltage.

As illustrated schematically in FIG. 23, stator assemblies 12 are interconnected to select a first operating voltage, such as 120 volts. Broken lines indicate an electrical connection. With respect to phase-1, each end of conductor 110 in each stator assembly 12 is connected by a removable pin 40 to the corresponding end of conductor 110 in another stator assembly 12. Thus, all conductors 110 are connected in parallel. Similarly, with respect to phase-2, each end of conductor 112 in each stator assembly 12 is connected by a removable pin 40 to the corresponding end of conductor 112 in another stator assembly 12. Thus, all conductors 112 are connected in parallel. All conductors 114 and 116 are similarly connected in parallel. Pins 40 at one of the endmost stator assemblies 12 may be connected to electrical power leads 44 (FIG. 1). It should be noted that all indicia 158 are aligned, but indicia 160 and indicia 162 are not aligned.

Figure 24:
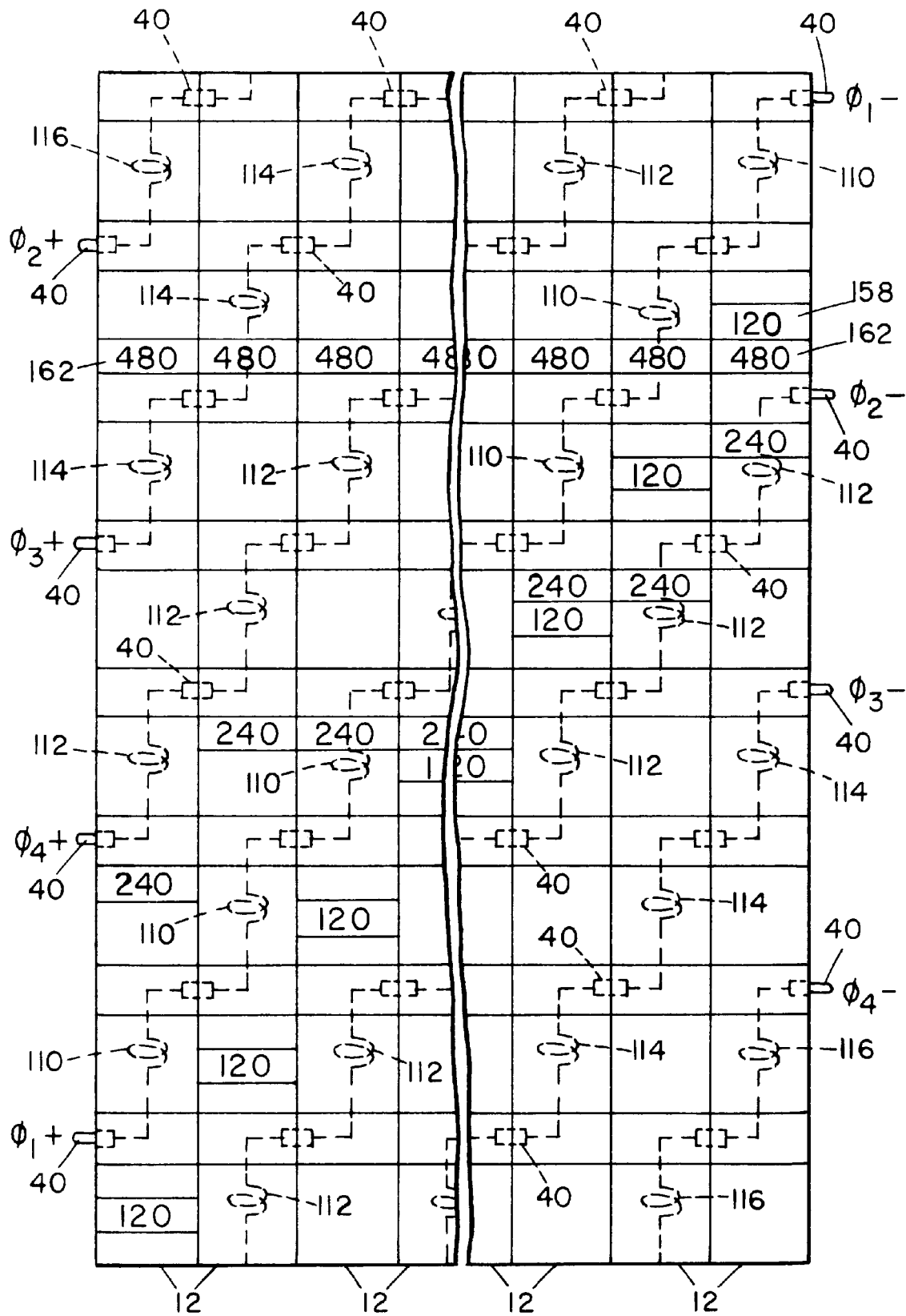
FIG. 24 is a schematic diagram of the stators connected to one another in a configuration selected to operate the motor/generator at a second voltage.

As illustrated schematically in FIG. 24, stator assemblies 12 are interconnected to select a second operating voltage, such as 480 volts. As in FIG. 24, broken lines indicate an electrical connection. With respect to phase-1, with the exception of the two endmost stator assemblies 12, a first end of conductor 110 in each stator assembly 12 is connected by a removable pin 40 to a second end of conductor 110 in another stator assembly 12. Thus, all conductors 110 are connected in series. Similarly, with respect to phase-2, with the exception of the two endmost stator assemblies 12, a first end of conductor 112 in each stator assembly 12 is connected by a removable pin 40 to a second end of conductor 112 in another stator assembly 12. Thus, all conductors 112 are connected in series. All conductors 114 and 116 are similarly connected in series. Pins 40 at the endmost stator assemblies 12 may be connected to electrical power leads 44 (FIG. 1). It should be noted that all indicia 162 are aligned, but indicia 158 and indicia 160 are not aligned.

Figure 25:
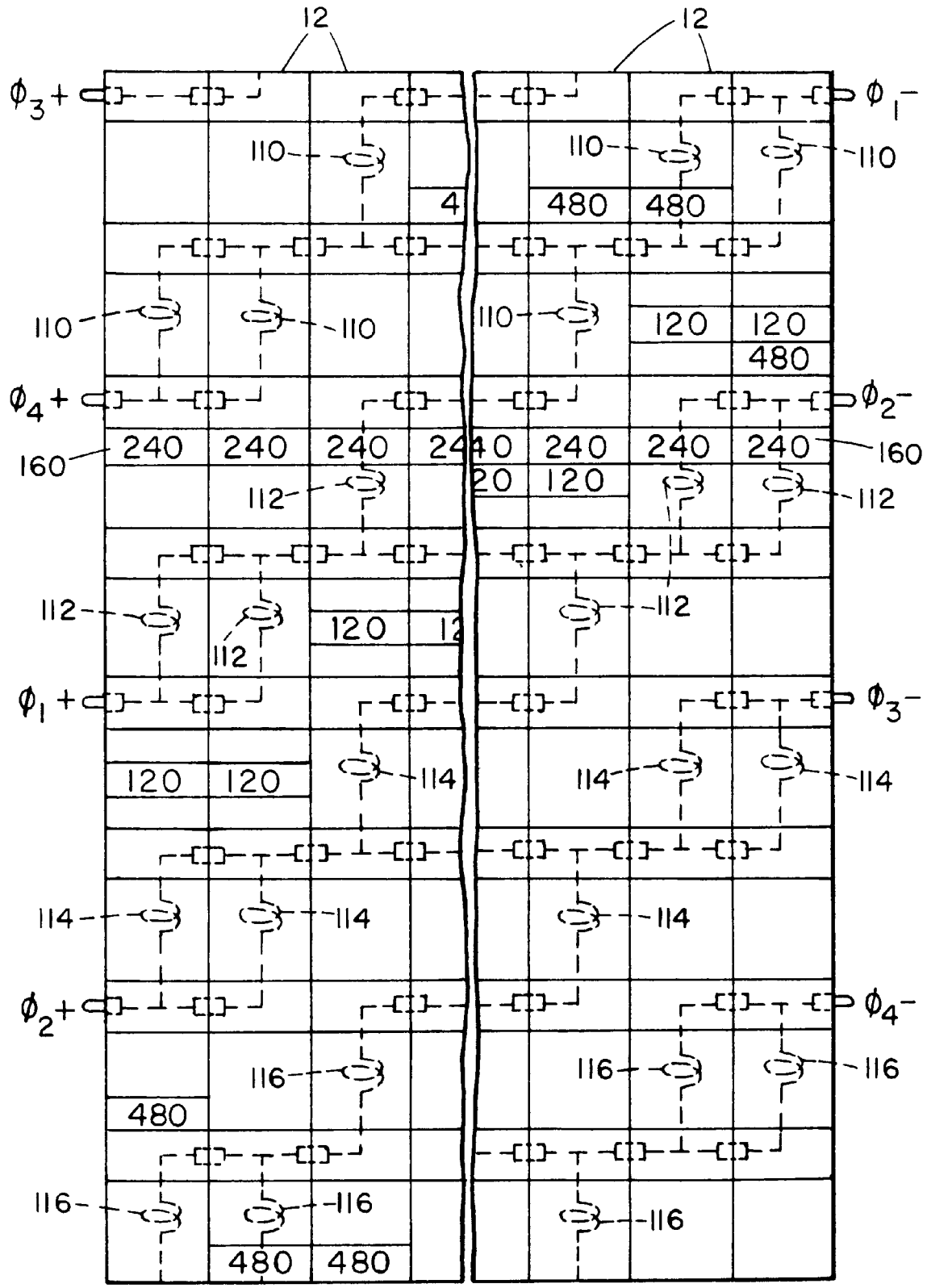
FIG. 25 is a schematic diagram of the stators connected in a configuration selected to operate the motor/generator at a third voltage.

As illustrated schematically in FIG. 25, stator assemblies 12 are interconnected to select a third operating voltage, such as 240 volts. In the same manner as in FIGS. 23 and 24, broken lines indicate an electrical connection. With respect to phase-1, with the exception of the two endmost stator assemblies 12, the corresponding first and second ends of conductors 110 in two adjacent stator assemblies 12 are connected to each other by a removable pin 40; a first end of conductor 110 in one of those stator assemblies 12 is connected by a removable pin 40 to a second end of conductor 110 in a third stator assembly 12; and the corresponding first and second ends of conductors 110 in the third stator assembly 12 and an adjacent fourth stator assembly 12 are connected to each other by a removable pin 40. Thus, groups of two conductors 110 are connected in parallel, and the groups are connected in series. Similarly, with respect to phase-2, with the exception of the two endmost stator assemblies 12, the corresponding first and second ends of conductors 112 in two adjacent stator assemblies 12 are connected to each other by a removable pin 40; a first end of conductor 112 in one of those stator assemblies 12 is connected by a removable pin 40 to a second end of conductor 112 in a third stator assembly 12; and the corresponding first and second ends of conductors 112 in the third stator assembly 12 and an adjacent fourth stator assembly 12 are connected to each other by a removable pin 40. Thus, groups of two conductors 112 are connected in parallel, and the groups are connected in series. All conductors 114 and 116 are similarly connected in parallel groups of two that are connected in series. Pins 40 at the endmost stator assemblies 12 may be connected to electrical power leads 44 (FIG. 1). It should be noted that all indicia 160 are aligned, but indicia 158 and indicia 162 are not aligned.

As persons of skill in the art will appreciate, the conductors may be interconnected in various combinations of series and parallel groups to provide more than three selectable voltages. Moreover, the illustrated set of voltages is exemplary only; in view of the teachings herein, persons of skill in the art will readily be capable of constructing a motor/generator operable at other voltages.

6. Conclusion

The motor/generator has a modular construction and a high power-to-weight ratio because no metal casing is required to contain the magnetic field. The field has a serpentine shape and is contained within the rotor structure by the magnets 54 themselves and two relatively small endplates 64 and 66.

The magnets 54 are polarized into a number of sectors 57 to minimize demagnetization prior to assembly of the rotor. Thus, the magnets 54 may be magnetized prior to assembly and maintained in inventory by the manufacturer. No keeper need be used to maintain the magnetization. Similarly, the rotor may be removed from the motor/generator to select a different operating voltage without substantially demagnetizing the magnets 54.

The modular construction facilitates voltage selection. To select the voltage,. the orientation of each stator assembly 12 may be selected with respect to other stator assemblies 12 and then connected to other stator assemblies 12 by removable pins 40. Indicia 158, 160 and 162 on the stator assemblies 12 may aid the user in selecting the orientation.

Figure 26:
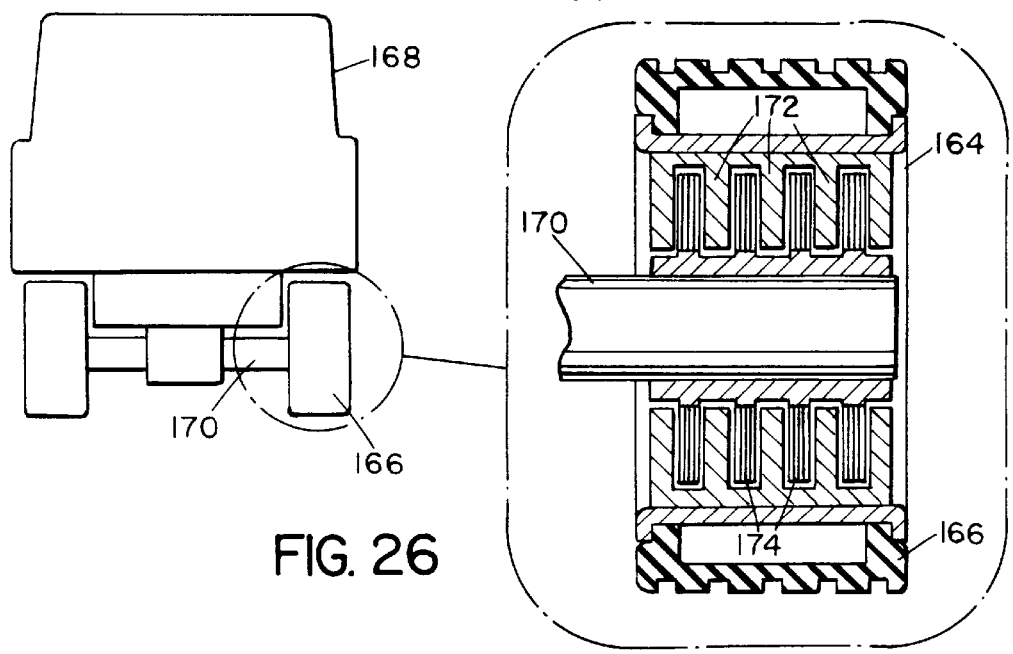
FIG. 26 is, in part, a front elevation view of a vehicle having the motor/generator disposed within a wheel and, in part, a cross-sectional detail view of an alternative embodiment of the motor/generator suitable for installation within the wheel.

The motor/generator may be used to power any suitable type of device, machine or vehicle. For example, it may be used in domestic appliances such as refrigerators and washing machines. It may also be used to power vehicles such as automobiles, trains and boats. One such use as a power plant in a vehicle is illustrated in FIG. 26. In the embodiment illustrated in FIG. 25, the motor/generator is mounted in a casing 164 that functions as the hub for a traction device such as the rubber tire 166 of an automotive vehicle 168. The shaft 170 is fixedly, i.e., non-rotatably, connected to the body of vehicle 168. The rotor discs 172, which are of substantially the same construction as described above with respect to other embodiments, are fixedly connected to casing 164 and thus rotate with tire 166. The stator assemblies 174 are fixedly connected to shaft 170 but are otherwise constructed as described above with respect to other embodiments. In operation, the rotation of rotor discs 172 propels the vehicle while the shaft remains stationary with respect to the ground.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A stator for a motor/generator, comprising:
   a plurality of annular casings, each enclosing a conductor phase assembly and removably connectable to an adjacent one of said annular casings along an axis, said conductor phase assembly including a winding having an elongated conductor portion oriented in a generally radial direction with respect to said axis; and
   a pin electrically connecting a conductor phase assembly of a casing to a conductor phase assembly of an adjacent casing.

2. The stator recited in claim 1, wherein:
   each annular casing encloses a plurality of conductor phase assemblies; and
   a plurality of said pins are disposed at equal angular spacings with respect to said axis.

3. A stator for a motor/generator, comprising:
   a planar substrate; and
   a metallic layer bonded to said substrate and defining a conductor phase assembly, said conductor phase assembly including a plurality of windings angularly distributed around an axis normal to said planar substrate, each winding having an elongated conductor portion oriented in a generally radial direction with respect to said axis, said planar substrate and said metallic layer bonded to said substrate define a lamination; and
   said stator has a plurality of said laminations electrically attached to one another along said axis.

4. The stator recited in claim 3, wherein each winding in a lamination of said plurality of laminations is aligned with a corresponding winding in all other laminations of said plurality of laminations and electrically connected to said corresponding winding.

5. The stator recited in claim 4, wherein each winding is electrically connected to said conductor phase assembly in an adjacent lamination.

6. The stator recited in claim 5, wherein each winding has an opening having a metallic wall electrically connecting said winding to a corresponding winding in an adjacent lamination.

7. The stator recited in claim 3, wherein said laminations are bonded to one another.

8. The stator recited in claim 3, wherein each lamination has two sides, and has a metallic layer bonded to each of said sides.

9. The stator recited in claim 8, further comprising an insulating material between said laminations.

10. The stator recited in claim 3, wherein said planar substrate is made of sheet-like plastic having a thickness less than about ten mils.

11. The stator recited in claim 10, wherein said metallic layer has a thickness less than about five mils.

12. A stator for a motor/generator, comprising:
    a plurality of laminations bonded to one another along an axis, each having a planar substrate normal to said axis, a first metallic layer bonded to a first side of said substrate and a second metallic layer bonded to a second side of said substrate, said metallic layers defining a conductor phase assembly, said conductor phase assembly including a plurality of windings angularly distributed around said axis, each winding having an elongated conductor portion oriented in a generally radial direction with respect to said axis; and
    each winding in a lamination is axially aligned with a corresponding winding in all other laminations and electrically connected to said conductor phase assembly of an adjacent lamination.

13. The stator recited in claim 12, wherein:
    said first metallic layer has a plurality of substantially radial arms not connected to one another, and said second metallic layer has a plurality of substantially radial arms not connected to one another;
    each radial arm of said first metallic layer has a connection area axially aligned with a corresponding connection area of said second metallic layer and electrically connecting a radial arm of said first metallic layer to a radial arm of said second metallic layer; and
    each winding comprises a radial arm of said first metallic layer and an electrically connected radial arm of said second metallic layer, wherein electrically connected and axially aligned radial arms of all said laminations together define said elongated conductor portions of said conductor phase assembly.

14. The stator recited in claim 13, wherein each radial arm has an opening having a metallic interior wall electrically connecting a radial arm of said first metallic layer to a radial arm of said second metallic layer.

15. The stator recited in claim 14, wherein said metallic interior wall of a radial arm of each lamination is electrically connected to a metallic interior wall of a radial arm of an adjacent lamination.

* * * * *